US012784218B2

(12) United States Patent
Lippenszky et al.

(10) Patent No.: US 12,784,218 B2
(45) Date of Patent: Nov. 3, 2026

(54) DEEP LEARNING-BASED ORGAN SEGMENTATION QUALITY ASSURANCE FOR MEDICAL IMAGES

(71) Applicant: GE Precision Healthcare LLC, Waukesha, WI (US)

(72) Inventors: Levente Lippenszky, Budapest (HU); László Ruskó, Budapest (HU); István Megyeri, Szeged (HU); Krisztián Koós, Szeged (HU); András Levente Frontó, Budapest (HU)

(73) Assignee: GE Precision Healthcare LLC, Waukesha, WI (US)

( * ) Notice: Subject to any disclaimer, the term of this patent is extended or adjusted under 35 U.S.C. 154(b) by 352 days.

(21) Appl. No.: 18/607,744

(22) Filed: Mar. 18, 2024

(65) Prior Publication Data

US 2025/0292406 A1 Sep. 18, 2025

(51) Int. Cl.
*G06T 7/00* (2017.01)
*G06T 5/70* (2024.01)
(Continued)

(52) U.S. Cl.
CPC .............. *G06T 7/0014* (2013.01); *G06T 5/70* (2024.01); *G06T 7/11* (2017.01); *G06T 12/00* (2026.01);
(Continued)

(58) Field of Classification Search
CPC . G06T 7/0014; G06T 5/70; G06T 7/11; G06T 12/00; G06T 2207/10072;
(Continued)

(56) References Cited

U.S. PATENT DOCUMENTS

2016/0321512 A1 11/2016 Sarachan et al.
2017/0213067 A1 7/2017 Padmanabhan et al.
(Continued)

OTHER PUBLICATIONS

Larrazabal, "Post-DAE: Anatomically Plausible Segmentation via Post-Processing with Denoising Autoencoders", Jun. 24, 2020, IEEE, vol. 39 Issue: 12 (Year: 2020).*
(Continued)

*Primary Examiner* — Oneal R Mistry
*Assistant Examiner* — Justin Philip Cascais

(57) ABSTRACT

A deep-learning based framework to assess the quality of medical image auto-segmentation is described. According to an example, a computer-implemented method comprises receiving segmentation masks generated, via one or more segmentation models, from medical image data depicting an anatomical region of a subject, wherein each of the segmentation masks depicts a different anatomical structure of a set of different anatomical structures included in the anatomical region. The method further comprises generating reconstructed versions of the segmentation masks based on application of a multi-channel reconstruction model to the segmentation masks, wherein the reconstructed versions correspond to optimized versions of the segmentation masks. The method further comprises determining an assessment of quality of the segmentation masks based on comparison of the segmentation masks to the reconstructed versions, generating output data regarding the assessment of quality, and rendering the output data via an electronic output device.

19 Claims, 11 Drawing Sheets

(51) Int. Cl.
*G06T 7/11* (2017.01)
*G06T 12/00* (2026.01)
*G06V 10/776* (2022.01)

(52) U.S. Cl.
CPC .. *G06V 10/776* (2022.01); *G06T 2207/10072* (2013.01); *G06T 2207/20081* (2013.01); *G06T 2207/20084* (2013.01); *G06T 2207/30096* (2013.01); *G06T 2207/30101* (2013.01); *G06V 2201/03* (2022.01)

(58) Field of Classification Search
CPC . G06T 2207/20081; G06T 2207/20084; G06T 2207/30096; G06T 2207/30101; G06T 2207/30008; G06T 2207/30004; G06V 10/776; G06V 2201/03; G06V 10/761; G06N 3/0455; G06N 3/0464; G06N 3/088
See application file for complete search history.

(56) References Cited

U.S. PATENT DOCUMENTS

| | | | | |
|---|---|---|---|---|
| 2022/0044412 | A1* | 2/2022 | Yang | G06T 7/12 |
| 2023/0306590 | A1* | 9/2023 | Jazdzyk | G06T 7/0012 |

OTHER PUBLICATIONS

Hui, et al., "Quality assurance tool for organ at risk delineation in radiation therapy using a parametric statistical approach," Med Phys. May 2018; 45(5):2089-2096. doi: 10.1002/mp.12835, Epub Mar. 23, 2018.

Monai.IO, "Network architectures," https://docs.monai.io/en/stable/networks.html#unet, Retrieved from the Internet: Jan. 11, 2024, pp. 1-87.

Monai.IO, "Network architectures," https://docs.monai.io/en/stable/networks.html#unet, Retrieved from the Internet: Jan. 11, 2024, pp. 88-175.

Nourzadeh, et al., "Knowledge-based quality control of organ delineations in radiation therapy," Jan. 2022, Medical Physics 49(2), DOI:10.1002/mp.15458, https://www.researchgate.net/publication/357841133_Knowledge-based_quality_control_of_organ_delineations_in_radiation_therapy.

Altman, et al., "A framework for automated contour quality assurance in radiation therapy including adaptive techniques," Jun. 2015, Physics in Medicine & Biology 60(13):5199-5209, DOI:10.1088/0031-9155/60/13/5199, https://www.researchgate.net/publication/278792718_A_framework_for_automated_contour_quality_assurance_in_radiation_therapy_including_adaptive_techniques.

Gonzalez, et al., "Detecting when pre-trained nnU-Net models fail silently for Covid-19 lung lesion segmentation," arXiv:2107.05975v2 [eess.IV] Jul. 14, 202, https://arxiv.org/pdf/2107.05975.pdf.

Chen, et al., "CNN-Based Quality Assurance for Automatic Segmentation of Breast Cancer in Radiotherapy," https://www.ncbi.nlm.nih.gov/pmc/articles/PMC7212344/pdf/fonc-10-00524.pdf, Frontiers in Oncology, Apr. 1, 2020, vol. 10, Article 524.

* cited by examiner

600

| Organ | Auto-Segmenation Mask | Model Reconstructed Mask | Results |
|---|---|---|---|
| Right femoral head |  |  | Outlier: Yes<br>Dice Score: 0.84<br>Threshold: 0.90<br><br>Basis - The auto-segmentation mask is under-segmented at the bottom. |
| Rectum |  |  | Outlier: Yes<br>Dice Score: 0.76<br>Threshold: 0.88<br><br>Basis - The auto-segmentation mask is under-segmented at the bottom. |

DEEP LEARNING-BASED ORGAN SEGMENTATION QUALITY ASSURANCE FOR MEDICAL IMAGES

TECHNICAL FIELD

This application relates to medical image processing and more particularly to a deep learning framework for assessing the quality of medical image auto-segmentations.

BACKGROUND

In recent years, deep learning-based methods, particularly methods based on the convolutional neural network, have shown great promise in medical image segmentation. Applications include object or lesion classification, organ or lesion detection, organ and lesion segmentation, registration, and other tasks. However, in order to be successfully applied for clinical applications such as intensity-modulated radiation therapy (IMRT) and others, the automated segmentation of the organ at risk (OAR) must be of sufficient accuracy and quality, which can be difficult to achieve owing to the inter-patient variability and the large number of anatomical structures to be segmented in a relatively small area. Many deep learning-based segmentation models may also generate inaccurate or insufficient results when the input scan is not acquired using the right imaging protocol, does not fully cover the whole anatomy, or is affected by severe artifacts. Accordingly, techniques for automatically assessing the output accuracy of such segmentation models prior to utilization of the segmentation results for clinical applications are needed.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are described that provide a deep learning framework for assessing the quality of medical image auto-segmentations.

According to an embodiment, a system is provided that comprises a memory that stores computer executable components, and a processor that executes the computer executable components stored in the memory. The computer executable components can comprise a reception component, a model execution component, a quality assessment component and a rendering component. The reception component receives segmentation masks generated, via one or more segmentation models, from medical image data depicting an anatomical region of a subject, wherein each of the segmentation masks depicts a different anatomical structure of a set of different anatomical structures included in the anatomical region. The model execution component generates reconstructed versions of the segmentation masks based on application of a multi-channel reconstruction model to the segmentation masks, wherein the reconstructed versions correspond to optimized versions of the segmentation masks. The quality assessment component determines an assessment of quality of the segmentation masks based on comparison of the segmentation masks to the reconstructed versions and generates output data regarding the assessment of quality, and the rendering component renders the output data via an electronic output device.

In various implementations, for each segmentation mask, the quality assessment component determines a measure of similarity between the segmentation mask and a reconstructed version of the segmentation mask, wherein the measure of similarity represents a measure of quality of the segmentation mask as generated via the one or more segmentation models, determines whether the segmentation mask is associated with an error based on whether the measure of similarity satisfies a threshold measure of similarity, and generates warning data indicating the segmentation mask is associated with the error based on a determination that the segmentation mask is associated with the error, wherein the output data comprises the warning data. In one or more implementations, the threshold measure of similarity varies for the different anatomical structures.

In some implementations, based on a determination that the segmentation mask is associated with the error, the quality assessment component determines, based on comparison of the segmentation mask to the reconstructed version, error information regarding a difference between a size and/or a geometry of the segmentation mask and the reconstructed version, and wherein the rendering component renders the warning data and the error information via an electronic display in association with rendering the segmentation mask and the reconstructed version of the segmentation mask.

Additionally, or alternatively, the quality assessment component determines whether the segmentation masks collectively satisfy an acceptable quality criterion based on collective measures of similarity determined for the segmentation masks, and wherein the output data indicates whether the segmentation masks collectively satisfy the acceptable quality criterion. In some implementations, the computer-executable components further comprise a regulation component that regulates usage of the segmentation masks by a clinical application based on whether the segmentation masks collectively satisfy the acceptable quality criterion.

In various embodiments, the multi-channel reconstruction model comprises a neural network model and the computer-executable components further comprise a training component that trains the multi-channel neural reconstruction model using an unsupervised machine learning process. The unsupervised machine learning process comprises training the multi-channel reconstruction model to generate reconstructed masks of respective noise augmented segmentation masks as included in respective training data sets using ground truth segmentation masks for the respective noise augmented segmentation masks, wherein the ground truth segmentation masks respectively depict the different anatomical structures as extracted from training medical image data, and wherein the respective noise augmented segmentation masks comprise noise augmented versions of the ground truth segmentation masks. With these embodiments, the computer-executable components can further comprise a noise augmentation component that generates the noise augmented segmentation masks from the ground truth segmentation masks, wherein for each ground truth segmentation mask, the noise augmentation component integrates an amount of noise data into the ground truth segmentation mask tailored based on a size and a geometry of an anatomical structure depicted in the ground truth segmentation mask.

In some embodiments, elements described in the disclosed systems and methods can be embodied in different forms such as a computer-implemented method, a computer program product, or another form.

DETAILED DESCRIPTION

Figure 1:
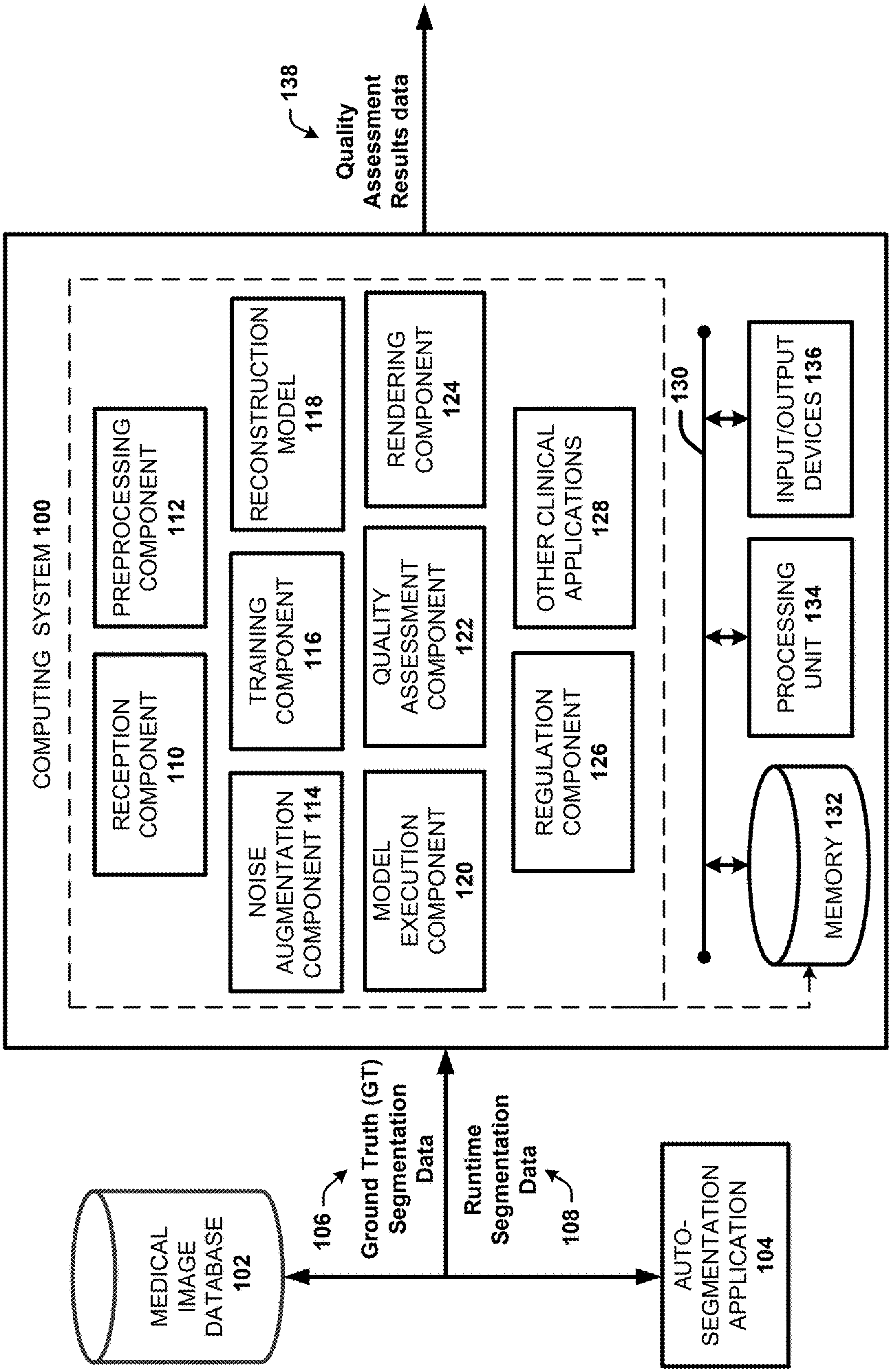
FIG. 1 presents an example system that facilitates assessing the quality of medical image auto-segmentations using a deep learning framework, in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that facilitate automatically assessing the output quality of one or more medical image segmentation models. The disclosed techniques were motivated by the usage of deep learning-based auto-segmentation of OAR in magnetic resonance (MR) imaging data and computed tomography (CT) data to guide performance of IMRT. There are many reasons why deep learning multi-organ segmentation in MR and CT may result in inaccurate organ contours. For example, the multi-organ segmentation model may have been trained for a particular MR sequence and may fail when the input is not acquired with the right imaging protocol. As it is very challenging to recognize all variants of an MR sequence, correct segmentation for all variants is not guaranteed. The disclosed techniques provide for automatically detecting and identifying abnormal segmentation results and informing the appropriate entities (e.g., the oncologist, the dosimetrists, etc.) accordingly prior to usage of the results for clinical applications such as IMRT and others.

To facilitate this end, the disclosed techniques provide an automated, deep learning-based framework to assess the quality of medical image segmentations. In various embodiments, the medical image segmentations include segmentation masks that are automatically generated (e.g., referred to herein as auto-segmentation masks) via one or more segmentation models, such as deep-learning based segmentation models or other types of automated medical image segmentation models. However, the disclosed techniques can be applied to manual segmentations as well. In this regard, the solution aims to detect outlier anatomical structure auto-segmentation masks and to minimize the risk of exposing inaccurate auto-segmentation masks to the medical professional. The anatomical structures segmented via the one or more segmentation models can vary (e.g., organs, vessels, tissues, regions of interest (ROI)s, etc.). The disclosed framework leverages an unsupervised anomaly detection approach. In various embodiments, the disclosed framework trains a deep learning neural network model (referred to herein as the reconstruction model) to reconstruct input segmentation masks into target versions of the respective input segmentation masks, the target versions corresponding to ground truth (GT) exemplars used during training. The input segmentation masks correspond to segmentation masks for different anatomical structures that a selected target auto-segmentation model is configured to automatically generate for a particular type of medical image data input (e.g., with respect to modality, anatomical region depicted, acquisition parameters employed, etc.).

During training, only the GT segmentation masks are initially needed. In various embodiments, the GT segmentation masks can correspond to previously curated GT segmentation masks that were manually annotated (e.g., via one or more medical professionals). In association with training the reconstruction model, noise data tailored to the specific anatomical structure depicted, is applied to each of the GT segmentation masks, resulting in generation of noise augmented versions of the GT segmentation masks. The reconstruction model is then trained to accurately reconstruct the GT segmentation masks from the corresponding noise augmented versions.

During inferencing mode (e.g., post training), the segmentation masks for the anatomical structures, as generated via the target segmentation model, are inputted to the trained version of the reconstruction model, which aims to approximate the GT segmentation masks. To this end, during inferencing mode, the reconstruction model generates reconstructed versions of the respective segmentation masks. As a result of training the reconstruction model, the reconstructed versions correspond to optimal versions of the segmentation masks, such as correct versions without any segmentation errors. The disclosed techniques further evaluate the similarity between each individual segmentation mask and its reconstructed version to determine whether each segmentation mask is of sufficient quality (e.g., relative to one or more defined quality criteria). For example, in some implementations, the similarity assessment can involve computing a measure of similarity (e.g., a Dice coefficient or a similar metric) between each individual segmentation mask and its' reconstructed version based on the amount of overlap between pixels or voxels included in the respective segmentation masks. The measure of similarity can also reflect differences in size and geometry (or shape) between the respective segmentation masks. To this end, the measure of similarity is independent of pixel and/or voxel intensities.

In this regard, the measure of similarity between an auto-segmentation mask and its corresponding reconstructed version represents a measure of quality or accuracy of the auto-segmentation mask as generated via the target segmentation model. The disclosed system can further identify and classify an auto-segmentation mask as being of insufficient quality (and thus inaccurate, associated with an error, an outlier, etc.) if its measure of similarity falls below a defined similarity threshold. In various embodiments, the defined similarity threshold can be tailored to the particular anatomical structure depicted in the auto-segmentation mask (e.g., the similarity measure threshold can vary for different types of anatomical structures). In this manner, as applied to evaluating the quality of the auto-segmentation results of a multi-structure segmentation model, the disclosed system can determine respective measures of similarity of the segmentation masks for each structure and identify any masks which are of insufficient quality. The quality assessment can also involve generating an overall quality score for the collective segmentation masks based on the collective similarity measures determined for each structure.

The results of the quality assessment can be used to regulate usage of the auto-segmentation masks by medical professionals and/or other clinical applications. For example, in some embodiments, the results of the quality assessment can be rendered to a suitable medical professional via a suitable output device and used to notify the medical professional regarding any auto-segmentation results deemed to be of low or insufficient quality, prompting their review prior to usage thereof for clinical purposes, such as prescribing radiation doses for organs-at-risk as applied to IMRT, and others. For example, the disclosed system can generate warnings and/or notifications regarding individual segmentation masks determined to be associated with an error, and/or regarding a set or group of segmentation masks determined to be collectively of insufficient quality.

In some embodiments, in association with rendering the quality assessment results, the disclosed system can render an auto-segmentation mask determined to be of low or insufficient quality next to its corresponding reconstructed version via a graphical display to enable visually reviewing the difference between the respective masks and observing the basis for which the auto-segmentation mask was classified by the system as having low or insufficient quality. In this manner, the system can provide visual information to reviewer (e.g., a radiologist or another medical professional) regarding regions or locations of the auto-segmentation associated with errors. In some implementations, in association determining the quality assessment, based on a determination that an auto-segmentation mask is associated with an error, the system can determine error information regarding differences between the size and/or geometry of the auto-segmentation mask and its' reconstructed version (e.g., based on comparison of the respective masks), and render the error information in association with rendering a comparative view of the auto-segmentation mask and its' reconstructed version. For example, the error information may indicate regions or locations of the auto-segmentation mask associated with an error, such as regions/locations that are over segmented or under segmented and the like.

In some embodiments, the disclosed system can also automatically control and/or regulate usage of the auto-segmentation masks by another automated clinical workflow (e.g., involving one or more automated processes using the auto-segmentation masks, such as automatically calculating the doses for the organs-at-risk as applied to IMRT, and others) based on the results of the quality assessment. For example, in some implementations, the disclosed system can prevent or block the automated clinical workflow from receiving and/or processing the auto-segmentation masks based on the results of the quality assessment indicating the auto-segmentation mask fail to satisfy an acceptable quality criterion.

In various embodiments, the reconstruction model comprises a multi-channel, deep neural network model configured to simultaneously process a plurality of different input segmentation masks via different channels, one channel for each different anatomical structure. However, in other embodiments, the reconstruction model can alternatively comprise a single channel model configured to process a single type of input segmentation mask corresponding to a single type of anatomical structure. With these embodiments, separate reconstruction models can be trained for different anatomical structure segmentation. Nevertheless, the multi-channel model provides technical advantages relative to the single channel variant. For example, the multi-channel model can have a significantly smaller memory footprint as compared to usage of a plurality of corresponding separate models, one for each different anatomical structure. In addition, as compared to usage of a plurality of separate models for each different anatomical structure, the multi-channel model can be executed with faster inferencing speed and thus reduces the amount of time for generating a corresponding output. The multi-channel model is also easier to develop and maintain. Furthermore, the multi-channel model can learn and leverage the relative positions between the different anatomical structures during training, resulting in more accurate reconstructed segmentation masks relative to the single model variant.

The disclosed solution is also modality-independent so, although it was developed for MR and CT segmentations, it can be applied on any other type of medical images. In this regard, the types of medical images processed/analyzed using the techniques described herein can include images captured using various types of image capture modalities. For example, the medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI or simply MR) images (including T1-weighted images and T2-weighted images), ultrasound (US) images, color flow doppler (CD) images, position emission tomography (PET) images, single-photon emissions computed tomography (SPECT) images, nuclear medicine (NM) images, optical, DWI and the like. The medical images can also include synthetic versions of native medical images such as synthetic X-ray (SXR) images, modified or enhanced versions of native medical images, augmented versions of native medical images, and the like generated using one or more image processing techniques. The types of medical image data processed/analyzed herein can include two-dimensional (2D) image data, three-dimensional image data (3D) (e.g., volumetric representations of anatomical regions of the body), and combinations thereof.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting computing system 100 that facilitates assessing the quality of medical image auto-segmentations using a deep learning framework, in accordance with one or more embodiments of the disclosed subject matter. Embodiments of systems described herein can include one or more machine-executable or computer-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, computing system 100 includes several machine/computer-executable components, including reception component 110, preprocessing component 112, noise augmentation component 114, training component 116, reconstruction model 118, model execution component 120, quality assessment component 122, rendering component 124, regulation component 126, and one or more other clinical applications 128. These computer/machine executable components can be stored in memory 132 of the computing system 100, which can be coupled to processing unit 134 for execution thereof. Computing system 100 can also include one or more input/output devices 136 that facilitate receiving user input and/or rendering output data to users in association with usage of the features and functionalities of the machine/computer-executable components. Computing system 100 also includes a system bus 130 that communicatively and operatively couples the memory 132, the processing unit 134 and the input/output devices 136 to one another. Examples of said and memory, processing unit, input/output devices 136, and other suitable computer or computing-based elements, can be found with reference to FIG. 9 and can be used in connection with implementing system or components shown and described in connection with FIG. 1 and other figures disclosed herein.

In accordance with various embodiments, computing system 100 is configured to process and evaluate the quality of auto-segmentation data generated for medical images. To facilitate this end, the computing system 100 uses GT segmentation data 106 to train (e.g., via training component 116) a deep neural network model (e.g., reconstruction model 118) to reconstruct noise augmented versions (e.g., as generated via noise augmentation component 114) of respective GT segmentation masks included in the GT segmentation data 106. For example, in various embodiments, the reconstruction model 118 can include or correspond to a convolutional denoising autoencoder. However, the reconstruction model 118 is not limited to this architecture and can include or correspond to other types of neural network models designed to process and reconstruct image data and/or spatial data.

Once trained, the computing system 100 applies (e.g., via model execution component 120) a trained version of the reconstruction model 118 to runtime segmentation data 108 to generate reconstructed versions of respective auto-segmentation masks included in the runtime segmentation data 108. As a result of training the reconstruction model 118, the reconstructed versions correspond to optimal or correct versions of the auto-segmentation masks without any segmentation errors. The quality assessment component 122 further determines an assessment of the quality of the respective auto-segmentation masks included in the runtime segmentation data 108 based on determined measures of similarity between the respective auto-segmentation mask and their corresponding reconstructed versions. The results of the quality assessment, represented in FIG. 1 as quality assessment results data 138, correspond to output data that can be generated by the quality assessment component 122 and be rendered (e.g., via rendering component 124) via any suitable electronica output device (e.g., of input output/devices 136, such as an electronic display), stored, provided to another system/device and/or used by regulation component 126 to regulate usage of the runtime segmentation data by one or more other clinical applications 128 (e.g., downstream automated processes, functions, applications, inferencing models, etc.).

In this regard, as illustrated in FIG. 1, computing system 100 can be communicatively and/or operatively coupled to (e.g., via one or more wired or wireless communication networks) a medical image database 102 and an auto-segmentation application 104 from which the reception component 110 can receive, collect or otherwise obtain the GT segmentation data 106 and the runtime segmentation data 108. The auto-segmentation application 104 can include or correspond to a medical image auto-segmentation application configured to execute one or more segmentation models on input medical image data and generate corresponding segmentation mask data (i.e., runtime segmentation data 108) for the medical image data. The segmentation mask data can include or correspond to image data that defines or outlines the contours of one or more defined anatomical structures as included in one or more input medical images, including one or more two-dimensional (2D) medical images (e.g., X-ray images, MR slice images, CT slice images, etc.) and/or one or more three-dimensional (3D) or volume medical image (e.g., an MR volume image, a CT volume image, etc.). Additionally, or alternatively, the segmentation mask data for a particular anatomical structure can include or correspond to an extracted portion of the input medical image including only the particular anatomical structure as isolated from or segmented out of the input medical image data. In embodiments in which the input medical image data comprises a 3D or volume medical image, the segmentation mask extracted for an anatomical structure depicted in the input medical image can comprise a 3D or volume segmentation mask. Likewise, in embodiments in which the input medical image data comprises a 2D medical image, the segmentation mask extracted for an anatomical structure depicted in the input medical image can comprise a 2D segmentation mask. As used herein, the term "auto-segmentation mask" is used to refer to a segmentation mask that was automatically generated via a segmentation model (e.g., as executed by the auto-segmentation application 104 or the like).

In this regard, the particular type of medical image data (e.g., modality, anatomical region depicted, imaging acquisition parameters, etc.) processed by the one or more segmentation models executed by the auto-segmentation application 104 can vary. Likewise, the number and type of anatomical structures automatically segmented via the corresponding segmentation model applied to the input medical image data via the auto-segmentation application 104 can also vary.

In accordance with various embodiments, the disclosed techniques are applied to evaluate multiple (e.g., two or more) anatomical structure segmentation masks corresponding to different anatomical structures respectively segmented from the same input medical image data (e.g., comprising one or more 2D and/or 3D medical images). With these embodiments, the runtime segmentation data 108 can include two or more auto-segmentation masks segmented from the same input medical image, wherein the two or more auto-segmentation masks respective depict different anatomical structures (e.g., organs, tissues, vessels, lesions, ROIs, etc.). In one example, the different anatomical structures can respectively correspond to different organs depicted in the input medical image data of a particular anatomical region of the body. For instance, in accordance with the examples illustrated in FIGS. 3 and 5, the different organs include a defined group of organs of the pelvis anatomy (e.g., the bladder, the left and right femoral heads, the penile bulb, the prostate, the rectum and the urethra) as included in 3D MR image data captured of the pelvis. With these embodiments, the auto-segmentation model applied by auto-segmentation application 104 can correspond to a multi-organ segmentation model configured to process the particular type of input medical image data (e.g., with respect to modality, anatomical region depicted, acquisition parameters, etc.) and generate respective segmentation masks for the different organs. The different anatomical structures are not limited to organs however and can include other structures, such as tissues, vessels, lesions, and defined ROIs. Alternatively, the auto-segmentation model applied by auto-segmentation application 104 can correspond a plurality of different single structures segmentations models applied to the same input medical image data, wherein each of the single structure segmentation models generate a segmentation mask for a different anatomical structure depicted in the input medical image.

However, in other embodiments, the segmentation model applied by the auto-segmentation application 104 can include or correspond to a single structure segmentation model configured to generate a single segmentation mask for a single target anatomical structure or ROI depicted in the input medical image data, and the runtime segmentation data 108 can include the single segmentation mask.

It should be appreciated that the auto-segmentation application 104 can be deployed and/or executed by any suitable computing device or system that can be communicatively coupled to the computing system (e.g., via one or more wired or wireless communication networks). In other embodiments, the auto-segmentation application 104 can be stored in memory 132 and executed by the computing system. Various architectural configurations are envisioned. In some embodiments, the input medical image data processed via the auto-segmentation application 104 to generate the runtime segmentation data 108 can be received thereby from the medical image database 102. Additionally, or alternatively, the input medical image data processed by the auto-segmentation application may be received directly from the medical image acquisition system (e.g., an X-ray system, a CT system, a MR system, etc.), and/or another suitable medical image data source.

The ground truth (GT) segmentation data 106 corresponds to a training dataset of GT segmentation masks that a particular auto-segmentation model whose output accuracy is being evaluated by the computing system 100 is configured to generate. In this regard, the reconstruction model 118 can be trained (e.g., via training component 116) to reconstruct one or more segmentation masks corresponding to those generated by a particular auto-segmentation model executed by the auto-segmentation application 104. Thus, the GT segmentation data 106 will correspond to GT examples of the runtime segmentation data 108 and will vary depending on the particular auto-segmentation model selected for evaluating the output segmentation accuracy thereof via the computing system 100. For example, as applied to a multi-organ segmentation model configured to generate 3D segmentation masks for a defined set of different organs included in the pelvis region depicted in 3D MR image data, the GT segmentation data 106 will include GT segmentation masks for the different organs as generated for a plurality of different 3D MR images of the pelvis region for different subjects/patients. Thus, the disclosed embodiments of computing system 100 assume that the particular auto-segmentation model whose output accuracy is being evaluated by the computing system 100 has been selected and/or otherwise indicated (e.g., via user input or via another mechanism).

It should be appreciated however that computing system 100 can be employed to generate any number of different reconstruction models 118 tailored to different auto-segmentation models. In various embodiments, the GT segmentation data 106 includes or corresponds to manually generated/defined segmentation masks defining the particular contours of the anatomical structures of interest as applied to respective medical images. As illustrated in FIG. 1, the GT segmentation data 106 can be included in medical image database 102 and received therefrom by the reception component 110 (e.g., collected, received, provided to, etc.). In other embodiments, the GT segmentation data 102 can be stored locally 132 and/or provided to the computing system 100 via another source (e.g., a medical imaging annotation application that provides for adding manual annotation segmentation data to medical image data, or the like).

Additional features and functionalities of the computer-executable components of computing system 100 are described with reference to FIGS. 2-10.

Figure 2:
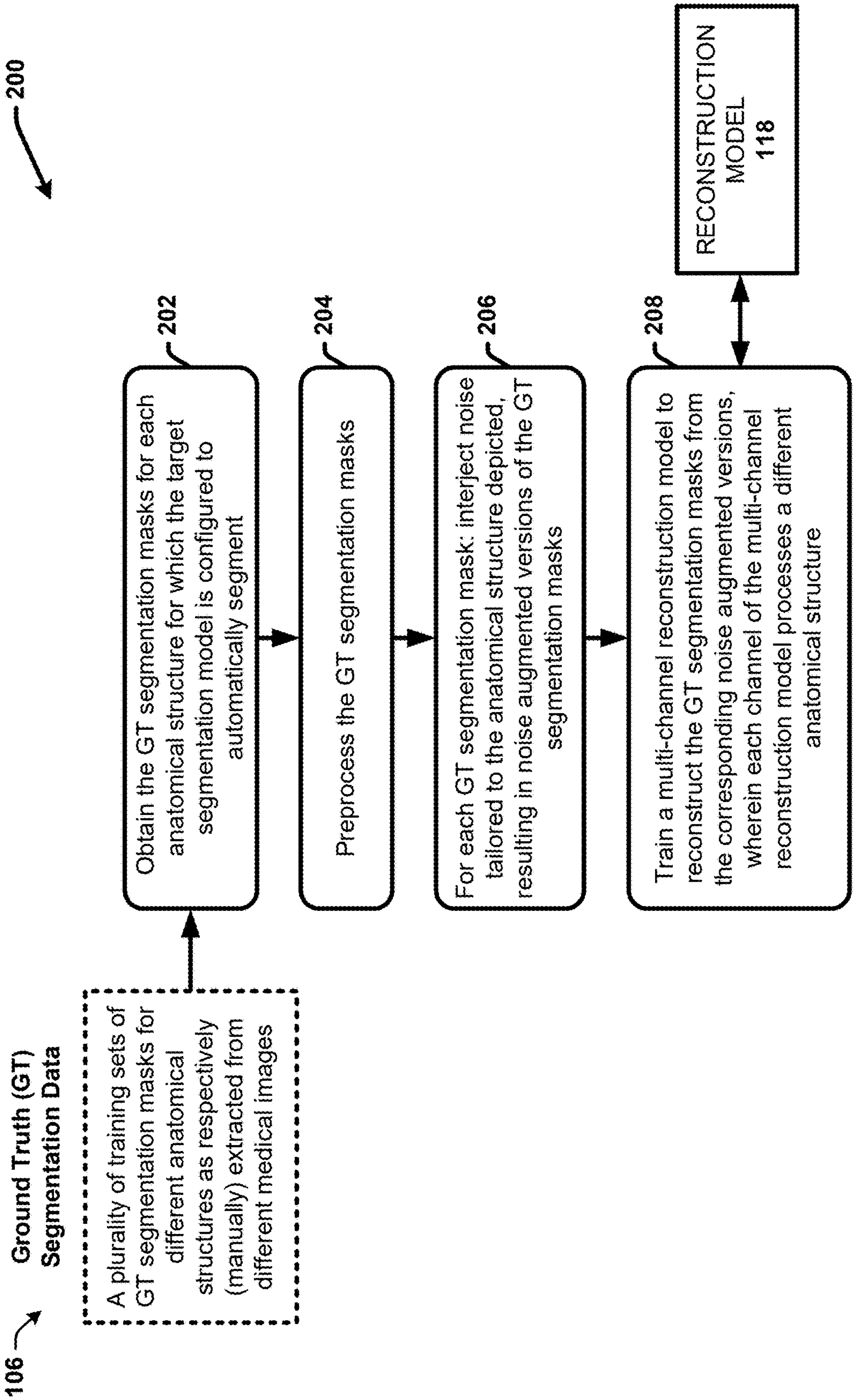
FIG. 2 presents a high-level flow diagram of an example computer-implemented process for generating a reconstruction model configured to generated reconstructed versions of input segmentation masks, in accordance with one or more embodiments of the disclosed subject matter.

FIG. 2 presents a high-level flow diagram of an example computer-implemented process 200 for generating a reconstruction model (e.g., reconstruction model 118) configured to generate reconstructed versions of input segmentation masks, in accordance with one or more embodiments of the disclosed subject matter.

With reference to FIGS. 1 and 2, process 200 begins after a particular segmentation model has been selected for output quality assessment, referred to hereinafter as the target segmentation model. In accordance with process 200, the target segmentation model can include a multi-structure segmentation model configured to generate segmentation masks for a plurality of different anatomical structures depicted in an input medical image (or images). Alternatively, the target segmentation model can include a plurality of separate segmentation models respectively configured to segment different anatomical structures (e.g., one structure per segmentation model) from the same input image.

In accordance with process 200, the reconstruction model 118 corresponds to a multi-channel reconstruction model comprising a plurality of channels configured to simultaneously (or in parallel) process multiple different input segmentation masks, one per each of the channels. The different input segmentation masks correspond to the different anatomical structures for which the target segmentation model is configured to automatically segment from an input medical image (or images). However, in other embodiments, the reconstruction model 118 can alternatively comprise a single channel model configured to process a single type of input segmentation mask corresponding to a single type of anatomical structure. With these embodiments, separate reconstruction models 118 can be trained for different anatomical structure segmentation in accordance with same or similar techniques used to train the multi-channel reconstruction model yet applied to only a single channel. Nevertheless, the multi-channel reconstruction model provides technical advantages relative to the single channel variant. For example, the multi-channel model can have a significantly smaller memory footprint and provide significantly faster inferencing speed as compared to usage of a plurality of corresponding separate models, one for each different anatomical structure. The multi-channel model is also easier to develop and maintain. Furthermore, the multi-channel model can learn and leverage the relative positions between the different anatomical structures during training, resulting in more accurate reconstructed segmentation masks relative to the single model variant.

At 202, the reception component 110 can obtain the GT segmentation masks (e.g., GT segmentation data 106) for each anatomical structure for which the target segmentation model is configured to automatically segment. This can include or correspond to a plurality of training sets of GT segmentation masks for the different anatomical structures as respectively accurately extracted from different medical images depicting the same anatomical region for different subjects/patients. For example, in some implementations, the GT segmentation mask can be manually generated. In other implementations, the GT segmentation masks can include auto-generated segmentation masks that have been determined to be accurate (e.g., based on manual review thereof and/or via another mechanism). To this end, the GT segmentation masks correspond to anatomically accurate or correct segmentation masks defining the boundaries or contours of the respective anatomical structures to perfection (e.g., without errors, as determined based on manual generation thereof and/or manual review of an auto-segmented mask, or the like).

In this regard, in some embodiments, each training each set of the plurality of training sets can correspond to a different medical image (e.g., captured from a different subject/patient) and comprise a group of segmentation masks, one mask for each of the different anatomical structures, as extracted from the corresponding medical image. For example, as applied to the target segmentation model being a 3D MR organ segmentation model for different defined organs of the pelvis region, one training set of GR segmentation masks can comprise a group of segmentations masks, the group comprising the different organ segmentation masks as extracted from a single MR volume image of the pelvis for a particular subject. Another training set of GR segmentation masks can comprise the group of segmentations masks, the group comprising the different organ segmentation masks as extracted from another single MR volume image of the pelvis for another particular subject, and so on.

The term "manually extracted" is used herein to refer to usage manual interaction to define the contours of the respective anatomical structures as included in the respective medical images. This is typically achieved using medical imaging annotation software that provides for viewing the respective medical images via a graphical user interface and provides annotation tools that enable an expert annotator (e.g., a radiologist or another trained medical professional) to mark and define the contours of the respective anatomical structures on or within the medical image as displayed. In some cases, the software can generate segmentation masks for the respective anatomical structures based on the user input and these segmentation masks can correspond to the GT segmentation masks. In other cases, the user can manually create (e.g., draw and define) the segmentation masks. Regardless of the mechanism via which they are generated as facilitated via manual input, it should be appreciated that the GT segmentation masks can include or correspond to 3D (as extracted from 3D medical images) or 2D (as extracted from 2D medical images) image data that accurately defines the contours, size and geometry of the respective target anatomical structures as depicted in respected medical images. In various embodiments, at 202, the reception component 110 can obtain the GT segmentation masks as already (manually) applied (or otherwise extracted from) the corresponding medical images as included in medical image database 102. In other embodiments, the GT segmentations masks can be manually curated at 202.

At 204, the preprocessing component 112 can preprocess the GT segmentation masks to normalize the respective GT segmentation mask prior to usage thereof for training the reconstruction model 118. This can involve performing one or more image processing functions to the respective GT segmentation masks to adjust and normalize their spacing, size, orientation and/or visual appearance. The one or more preprocessing function applied to the GT segmentation masks by the preprocessing component 112 can vary depending on the type (e.g., modality, anatomical region depicted, acquisition protocol used, etc.) of medical image data from which they are extracted. For example, in some implementations in which the GT segmentation masks correspond to 3D MR data covering the pelvis anatomy as extracted from 3D MR images, the preprocessing at 204 can include resampling the respective GT segmentation masks to isotropic spacing (e.g., a spacing of 1.5×1.5×1.5 millimeters (mm) and padding the respective GT segmentation mask to a common, predefined spatial size resolution (e.g., 240×336×336 voxels). In other example implementation in which the which the GT segmentation masks correspond to 3D CT data as extracted from 3D CT images, the preprocessing at 204 can include rotating each GT segmentation mask to common direction relative to the subject, resampling the GT segmentation mask to a defined spacing (e.g., 1.0×1.0×3.0 mm) and padding the GT segmentation masks to a predefined spatial size it to spatial size (e.g., 700×700×620 voxels). The preprocessed GT segmentation masks generated at 204 correspond to the target masks that the reconstruction model 118 uses during training in association with learning how to reconstruct corresponding noise augmented versions thereof to resemble.

At 206, the noise augmentation component 114 can generate the noise augmented versions of the preprocessed GT segmentation masks. This can involve, for each preprocessed GT segmentation mask, interjecting or applying noise data to the preprocessed GT segmentation mask tailored to the anatomical structure depicted, resulting in noise augmented versions of the preprocessed GT segmentation mask (i.e., the target masks). Generally, this includes adding and/or removing an amount of noise data to/from the respective preprocessed GT segmentation masks in proportion to the size, shape and/or geometry of the respective anatomical structures depicted. The noise augmented segmentation masks correspond to the input masks used during training of the (multi-channel) reconstruction model (e.g., provided as input to the reconstruction model 118), and the preprocessed GT segmentation masks correspond to the target masks. In various embodiments, the goal of the noise added to the segmentation masks is to create input segmentation masks with errors to the anatomical structure depicted. Such errors can correspond to segmentation errors (e.g., those typically generated by the target segmentation model), but can also correspond to any type of deformation of the anatomical structure depicted (e.g., holes, missing regions or patches of added and missing regions, etc.). In this regard, by using such noise-augmented segmentation masks as input, and their corresponding GT versions without the errors to train the reconstruction model 118, the reconstruction model 118 is forced to learn the correct physical characteristics (e.g., sizes and geometries) of the anatomical structures. As a result, the trained version of the reconstruction model 118 will be able to correct any segmentation error because it has learned the correct physical characteristics (e.g., size and geometry or shape) of the anatomical structures.

The process employed by the noise augmentation component 114 to generate the noise augmented versions of the target masks can vary based on parameters of the image data corresponding to the target masks, including whether the image data is 2D or 3D image data, the modality of the image data (e.g., MR, CT, X-ray, PET, etc.), the acquisition protocol used, and other parameters. In some embodiments, as applied to 3D segmentation masks, such as 3D MR organ segmentation masks for instance, the noise augmentation process can include adding or removing random, binary patches of pixels or voxels to/from the target mask (e.g., with probabilities 0.5 and 0.5) in accordance with defined hyperparameters and tailored values for the hyperparameters defined for the respective anatomical structures depicted. The patches of pixels or voxels correspond to groups of two or more pixels or voxels have a 2D or 3D geometrical array depending on whether the image data is 2D or 3D. In some implementations, the hyperparameters can include but are not limited to: maximum number of patches, minimum patch size, maximum patch size, and sampling method (refers to the logic used to sample the center of a patch). To this end, the specific values used for these hyperparameters can be tailored based on the size and/or geometry of the respective anatomical structures depicted in the target masks such that the amount of noise applied to each target mask is proportional to the size/geometry of the respective anatomical structures. In one example, implementation, for each anatomical structure (e.g., each organ or the like) the hyperparameters can be optimized in accordance with Equation 1 below, such that the signed Dice coefficients (sDC) of the noisy input mask roughly covers the [−1,1] interval, and wherein I and T are the input and target binary segmentation masks, respectively, wherein and sgn(•) denotes the sign function.

$$(sDC) \text{ as } sDC = sgn(|I| - |T|)\frac{2|I \cap T|}{|I| + |T|}. \qquad \text{Equation 1}$$

In another example embodiment as applied to 3D segmentation masks generated from CT image data (i.e., 3D CT organ segmentation masks), the noise augmentation process can include adding or removing random binary patches of pixels or voxels to/from the target mask (e.g., with probabilities 0.5 and 0.5) in accordance with defined hyperparameters and tailored values for the hyperparameters defined for the respective anatomical structures depicted. In some implementations, the hyperparameters can include but are not limited to: maximum number of patches, minimum patch size maximum patch size, and sampling method (refers to the logic used to sample the center of a patch). To this end, the specific values used for these hyperparameters can be tailored based on the size and/or geometry of the respective anatomical structures depicted in the target masks such that the amount of noise applied to each target mask is proportional to the size/geometry of the respective anatomical structures. In one example, implementation, for each anatomical structure (e.g., each organ or the like) the hyperparameters can also be optimized in accordance with Equation 1 below, such that the signed Dice coefficients (sDC) s of the noisy input mask roughly covers the [−1,1] interval.

At this point in process 200, the training component 116 now has the training dataset needed to train the reconstruction model 118. In this regard, the training dataset comprises, for each anatomical structure, a plurality of noise augmented segmentation masks (i.e., the input masks) respectively paired with (preprocessed) GT segmentation masks (i.e., the target masks). At 208, the training component 116 can then proceed to train the (multi-channel) reconstruction model 118 to correctly reconstruct the GT segmentation masks (i.e., the target masks) from the corresponding noise augmented versions (i.e., the input masks), wherein each channel of the multi-channel reconstruction model 118 processes a different anatomical structure. In this regard, the (multi-channel) reconstruction model 118 comprises a plurality of different channels respectively configured to process a different input mask corresponding to a different anatomical structure. To this end, the number of different channels corresponds to the number of different anatomical features for which the target segmentation model is configured to segment. In association with training the reconstruction model 118, the training component 116 can stack the paired input and target masks for each training set of the plurality of training sets channel wise such that each different mask pair corresponding to a different anatomical structure is allocated to the designated channel for that structure. In this regard, a first channel will process a plurality of pairs of input and target masks corresponding to a first anatomical structure, a second channel will process a plurality of pairs of input and target masks corresponding to a second anatomical structure, and so on.

The processing performed via the respective channels of the reconstruction model 118 is performed in parallel or simultaneously. In this regard, each channel of the (multi-channel) reconstruction model 118 processes an input mask independently through its own set of neural network layers, which may include convolutional layers, recurrent layers, or fully connected layers, depending on the architecture of the reconstruction model 118. The output of each channel includes a reconstructed version of the input mask, a noise augmented mask. The training process involves training the reconstruction model 118 to generate reconstructed versions of the respective input masks such that the reconstructed versions accurately resemble their corresponding GT versions. The training component 116 can control the training process such that respective input masks processed in parallel via the respective channels at each pass through the segmentation model 118 correspond to the same training set; that is, they correspond to segmentation masks extracted from the same medical image and thus reflect the different anatomical structures of a specific subject/patient. In this regard, each pass through the reconstruction model refers to processing the different input masks for the same training set (of the plurality of training sets) in parallel or simultaneously. In this manner, during training, the reconstruction model 118 can learn and leverage spatial relationships between the different anatomical structures as anatomically arranged, shaped and sized relative to one another within a given medical image and subject/patient.

During training, the parameters (e.g., filters, weights, biases, latent space representations, activation functions, etc.) of the neural network (or neural networks) employed by the reconstruction model 118 are learned using backpropagation and one or more optimization algorithms (e.g., gradient descent, stochastic gradient descent (SGD), momentum optimization, root mean square propagation, adaptive movement estimation (Adam optimization), or another optimization function), optimizing the reconstruction model 118 to make accurate predictions based on the average loss computed by the training component 116 for each output reconstructed mask across all channels for each pass (using a suitable loss function). In various embodiments, training component 116 can compute the loss for each reconstructed mask generated via each channel for a given pass based a measure of similarity between the reconstructed mask and the corresponding target mask (i.e., the corresponding, preprocessed GT mask). In this regard, the measure of similarity can be based on the amount of overlap between pixels or voxels included in the respective segmentation masks. The measure of similarity can also reflect differences in size and geometry between the respective segmentation masks. For example, the measure of similarity can include or correspond to a Dice score and/or another metric representative of the measure of similarity between size and/or geometry of the reconstructed mask and the corresponding target mask. For example, in some implementations, in association with computing the similarity and/or loss metric, the training component 116 can apply one or more image processing functions to the input mask and target mask that compare the respective masks, determine differences between the size and/or geometry of the respective masks, and quantify the differences using a similarity measure, such as a Dice coefficient/score or the like. To this end, the similarity comparison does not involve assessing differences in pixel and/or voxel intensities.

The training component 116 can further compute the average loss (e.g., average Dice loss or the like) across all channels for a given pass based on averaging the measures of similarity (e.g., Dice scores or the like) determined for all of the reconstructed masks across all channels. To this end, the Dice loss is defined as 1 minus the Dice score. During training, the goal is to minimize the average Dice loss or maximize the average Dice score. During the training process, the optimization algorithm employed by the training component 116 adjusts the parameters of the neural network iteratively to minimize the reconstruction error between the input masks and the reconstructed masks. The training process can proceed iteratively using conventional training and validation phases (e.g., splitting the training data accordingly) until one or more defined conditions are met, such as a specified number of epochs are reached, a loss criterion is realized and/or convergence is reached. To this end, the result or output of process 200 can include a trained version of the (multi-channel) reconstruction model 118 which can be saved (e.g., stored in memory) 132 and then applied by the model execution component 120 on the runtime segmentation data 108 in association using the reconstruction model 118 to evaluate the accuracy or quality of the runtime segmentation data 108.

In various embodiments, the reconstruction model 118 comprises a convolutional denoising autoencoder. With these embodiments, the multi-channel reconstruction model comprises an encoder network and a decoder network. The encoder consists of several convolutional layers followed by max-pooling layers. These layers gradually reduce the spatial dimensions of the input mask while increasing the number of channels or features extracted. The convolutional layers apply filters to extract meaningful features from the input mask. After the convolutional layers, the network can include one or more fully connected layers to further compress the feature representation into a lower-dimensional latent space representation. This latent space representation captures the essence of the input mask features in a more compact form. The decoder part of the network is responsible for reconstructing the input mask from the latent space representation to generate the reconstructed mask. It mirrors the architecture of the encoder but in reverse. It consists of one or more fully connected layers followed by upsampling layers (or transposed convolutional layers) to gradually increase the spatial dimensions of the data while decreasing the number of channels until the final output matches the dimensions of the input mask.

Figure 3:
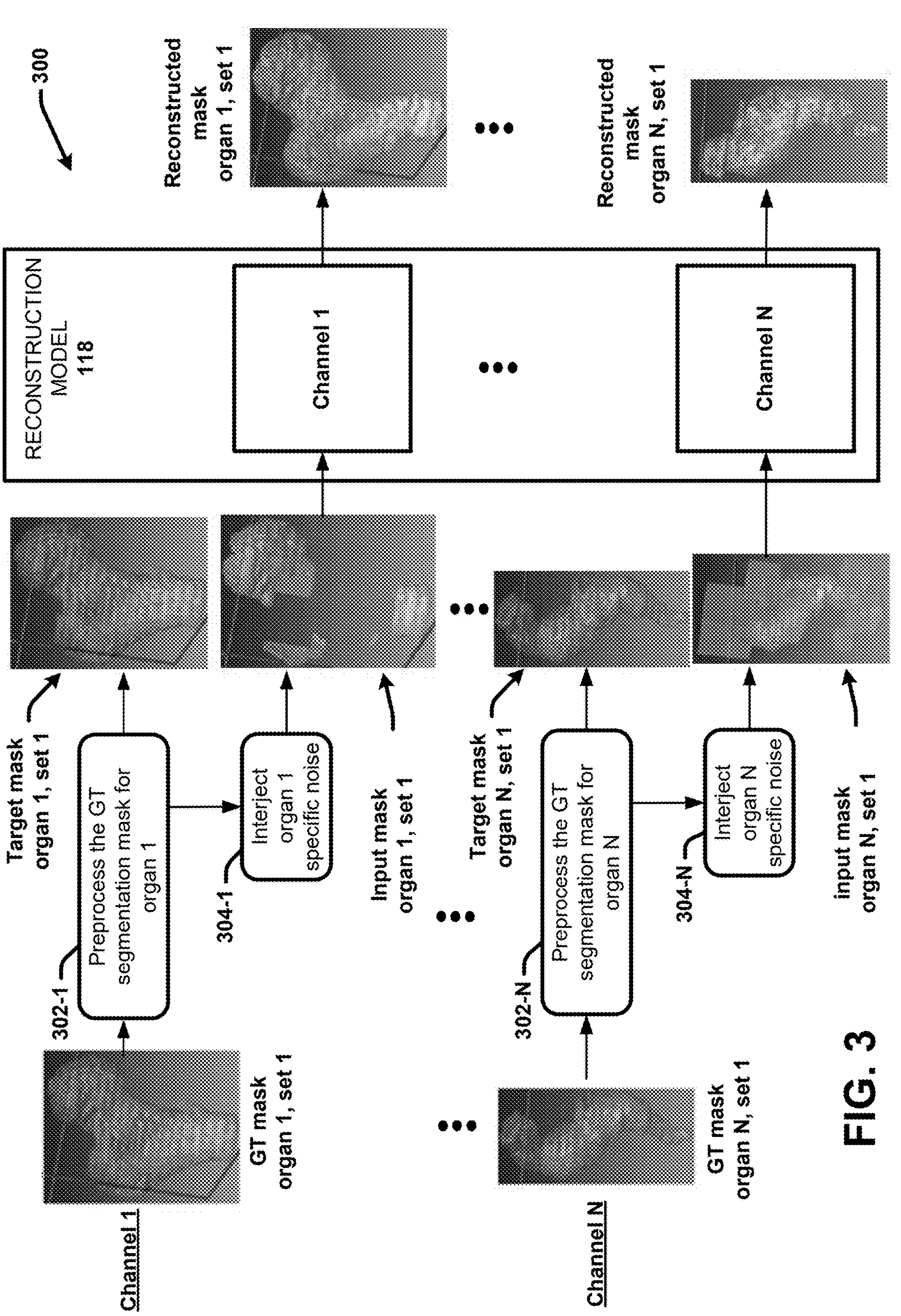
FIG. 3 illustrates an example implementation of the process presented in FIG. 2, in accordance with one or more embodiments of the disclosed subject matter.

FIG. 3 illustrates an example implementation of process 200, in accordance with one or more embodiments of the disclosed subject matter. In this regard, FIG. 3 presents an example process 300 for generating a reconstruction model (e.g., reconstruction model 118) configured to generate reconstructed versions of input segmentation mask as exemplified using MR segmentation masks of different organs respectively included in different MR images of the pelvis region. For example, the different organs can include the bladder, the left and right femoral heads, the penile bulb, the prostate, the rectum and the urethra for instance, (e.g., 7 different organs). In accordance with process 300, the target segmentation model corresponds to a multi-organ segmentation model configured to generate segmentation masks for the different organs respectively included in an MR volume (or 3D) image of the pelvis region. Thus, in this example implementation, the segmentation masks (e.g., the GT segmentation masks, the preprocessed GT segmentation masks, the noise augmented segmentation masks and the reconstructed segmentation masks) respectively correspond to volume or 3D segmentation masks for the respective organs. For example, the 3D segmentation masks for the respective organs can correspond to extracted portions of the MR volume image corresponding to the respective organs as isolated and removed from the MR volume image.

With reference to FIGS. 1-3, process 300 illustrates how different GT segmentation masks corresponding to different anatomical structures (e.g., different organs of the pelvis region in this example) can respectively be processed via different channels of the (multi-channel) reconstruction model 118. The different channels are delineated as channels 1-N, wherein the number N of channels corresponds to the number of different types of segmentation masks corresponding to the different anatomical structures. In this regard, each different organ segmentation mask is processed through a different designated channel of the reconstruction model 118. For ease of illustration, the different organs are generally referred to as organs 1-N to indicate their corresponding channels and only two example channels (one for organ 1 and another for the last organ N) are explicitly illustrated. It should be appreciated that number of channels N and thus number of different types of organ segmentation masks processed can include any number greater than 1 (as applied to a multi-channel reconstruction model). For instance, in one example of this implementation, the different organ segmentation masks can include segmentation masks for the bladder, the left and right femoral heads, the penile bulb, the prostate, the rectum and the urethra (e.g., 7 different organs and thus N=7). In various embodiments, as a multi-channel reconstruction model, the reconstruction model 118 comprises a single convolutional denoising autoencoder. The input to the reconstruction model is a 5D tensor of shape B, N, H, W, D; where B is the batch size, N is the number of channels, H is the height, W is the width, and D is the depth. For each example in the batch, each channel corresponds to an anatomical structure (e.g., a 3D binary volume). The output of this convolutional denoising autoencoder is a 5D tensor again with the same shape as the input. In this regard, the multi-channel reconstruction model processes all the organs together at once.

Process 300 demonstrates performance of the GT mask preprocessing and the generation of the noise augmented masks for the respective organs in parallel as arranged in channels in accordance with performing one pass through the reconstruction model 118 for respective GT segmentation masks 1-N corresponding to one training set (delineated set 1) of the plurality of training sets. In some embodiments, these steps can be performed in this manner (e.g., in parallel as arranged in channels). In other embodiments, all of the GT segmentation masks of all of the training sets can be preprocessed into the target masks and the noise augmented masks in a batch processing fashion and then organized and stacked into their respective channels for processing via the reconstruction model 118. It should be appreciated that although process 300 is demonstrated with respect to one training set (e.g., set 1), the training component 116 iteratively performs process 300 for all of the training sets.

To this end, following along channel 1, at 302-1, the preprocessing component 112 can preprocess the GT segmentation mask for organ 1, set 1 resulting in the target mask for organ 1, set 1. The preprocessing performed at 302-1 can correspond to the preprocessing described with respect to 204 of process 200. At 304-1, the noise augmentation component 114 can interject noise into the target mask specific to organ 1, resulting in transformation of the target mask into the noise augmented mask for organ 1, set 1, which is the input mask for organ 1. The preprocessing performed at 304-1 can correspond to the noise augmentation processes described with respect to 206 of process 200 and the 3D MR segmentation mask implementation. As can be seen via comparison of the target mask to the input mask for organ 1, the noise augmented input mask includes removed pixels or voxels and thus provides an example of a segmentation mask with errors resembles an input segmentation mask with segmentation errors. The training component 116 further inputs the input mask for organ 1 into channel 1 of the reconstruction model 118 and the channel 1 neural network generates a reconstructed mask for organ 1 as output. In this regard, channel 1 is particularly trained and configured to generate reconstructed segmentation masks for only one specific type of anatomical structure (and image data input), which in this example corresponds to organ 1 (and a 3D MR segmentation mask of the same).

In accordance with process 300, the same process described above with respect to organ 1 and channel 1 is performed for all the different organs and channels in parallel for the same training set (e.g., set 1). For example, step 302-N corresponds to step 302-1 yet tailored to the GT mask for organ k. Likewise, step 304-N corresponds to step 304-1 yet tailored to organ N as depicted in the target mask for organ N. The training component 116 further inputs the input mask for organ N into channel N of the reconstruction model 118 and the channel N neural network generates a reconstructed mask for organ N as output. In this regard, channel N is particularly trained and configured to generate reconstructed segmentation masks for only one specific type of anatomical structure (and image data input), which in this example corresponds to organ N (and a 3D MR segmentation mask of the same).

After one pass of all the input masks for training set 1 through the corresponding channels of the reconstruction model 118, the output includes reconstructed masks for all of the input masks. The training component 116 further computes the measures of similarity (e.g., Dice scores or the like) between the reconstructed masks and their corresponding target masks. As noted above, the measures of similarity can respectively reflect an amount of overlap between pixels or voxels included in the respective masks, differences in size between the respective masks and/or differences in geometry between the respective masks. The training component 116 can further compute an average loss (e.g., an average Dice loss) across all channels for the set (e.g., set 1). The training component 116 then optimizes (e.g., tunes) the appropriate parameters of the respective channels in accordance with a defined optimization function based on the loss and/or the average loss (e.g., corresponding to the average loss across all channels) and repeats this training process for additional training sets.

In this example illustration, the reconstructed masks for organ 1 and organ N substantially corresponds to their respective target masks. It should be appreciated that this result is to be expected after several training passes or epochs through the reconstruction model 118 and that initially (e.g., the only first few passes), the output reconstructed masks most likely will not be accurate because the reconstruction model 118 has not yet optimized its parameters based on multiple passes and measures of loss between the reconstructed masks and corresponding target masks. In this regard, during training, the training component 116 uses the differences (e.g., as measured via a Dice score or another similarity metric) between the reconstructed masks and their target masks to tune the model's parameters until the reconstructed masks accurately reflect their corresponding target masks (in accordance with defined acceptable loss criteria and/or other training process completion condition criteria). To this end, once this has been achieved, the training component 116 can end process 300. The final output of process 300 can include a trained version of the (multi-channel) reconstruction model 118 which can be saved (e.g., stored in memory) 132 and then applied by the model execution component 120 on the runtime segmentation data 108 in association using the reconstruction model 118 to evaluate the accuracy or quality of the runtime segmentation data 108, as further described with reference to FIGS. 4 and 5.

Figure 4:
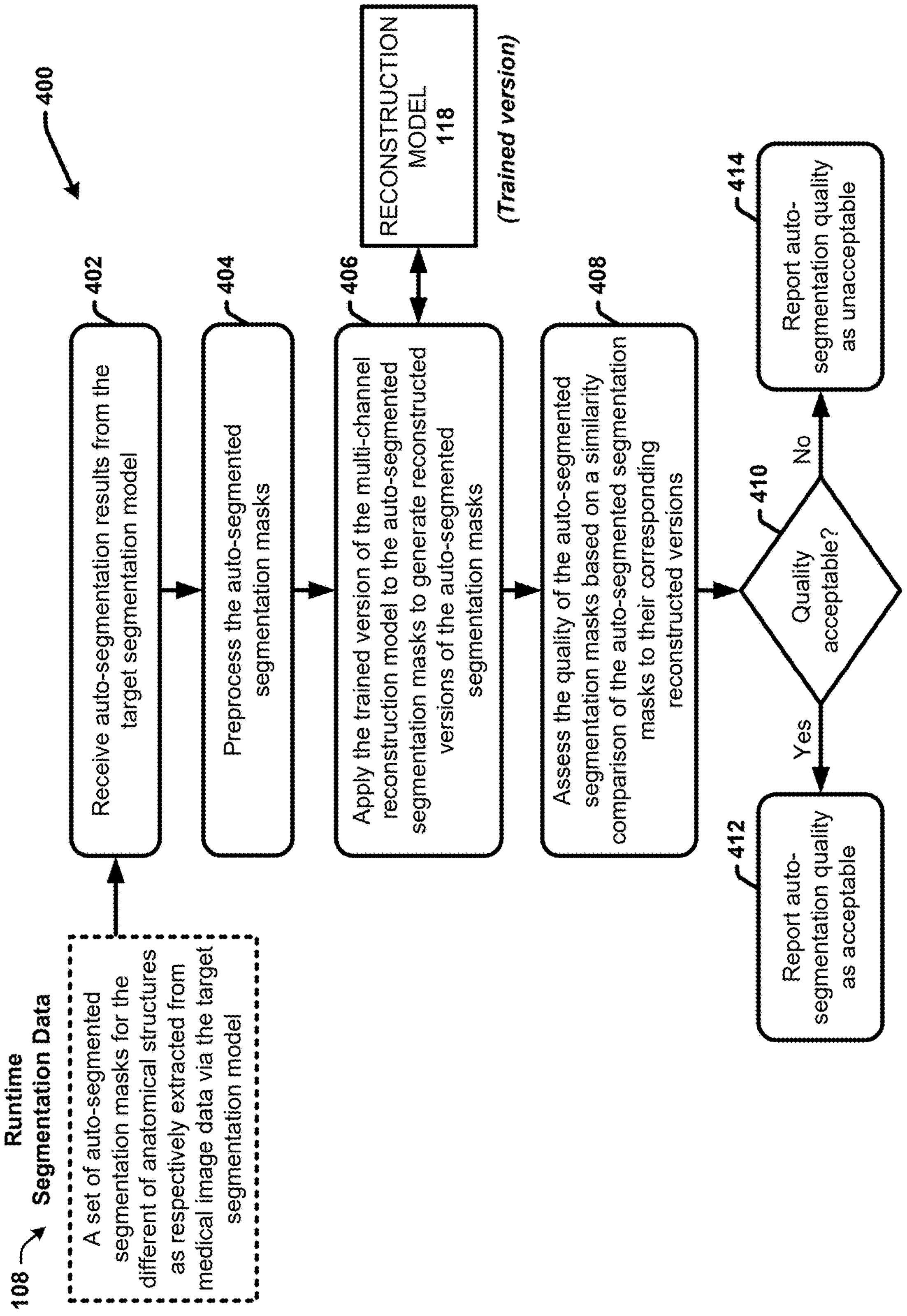
FIG. 4 presents a high-level flow diagram of an example computer-implemented process for automatically assessing the output quality of a multi-structure segmentation model, in accordance with one or more embodiments of the disclosed subject matter.

FIG. 4 presents a high-level flow diagram of an example computer-implemented process 400 for automatically assessing the output quality of a multi-structure segmentation model, in accordance with one or more embodiments of the disclosed subject matter. Process 400 is described with respect to the target segmentation model being the same target segmentation model involved in process 200 and/or process 300, and in which the trained version of the reconstruction model 118 corresponds to the multi-channel reconstruction model described and trained in accordance with process 200 and/or process 300. With reference to FIGS. 1-4, in accordance with process 400, at 402, the reception component can receive auto-segmentation results from the target segmentation model (e.g., the runtime segmentation data 108). In this regard, continuing with the embodiments described in FIGS. 2 and 3, the auto-segmentation results can include a set of auto-segmentation masks for the different anatomical structures as respectively extracted from medical image data (e.g., new medical image data other than that used for model training) via the target segmentation model. For example, in accordance with the 3D MR organ segmentation implementation illustrate in FIG. 3, the auto-segmentation results received at 402 can include 3D MR segmentation masks for the defined set of different organs of the pelvic region that were automatically segmented from a 3D MR image of the pelvic region via a corresponding multi-organ segmentation model.

In some cases, the results of the auto-segmentation may be missing one or more of the organ/structure segmentations, owing to either errors in the target segmentation model or the input medical image. The results may also be missing one or more of the organ/structure segmentations based on the input image data covering only a portion of the region of interest capable of being processed by the target segmentation model. Thus, in some implementations, at 402, the set of segmentation masks received at 202 may include only some (e.g., one or more) of the different of anatomical structures for which the reconstruction model 118 has been configured to process. With these implementations, the corresponding channel or channels of the reconstruction model 118 for the missing segmentation mask or masks can be deactivated during inferencing mode or generate error information indicating that no segmentation mask for the corresponding structures is available.

At 404, the preprocessing component 112 preprocesses the auto-segmentation masks using the same (or similar) preprocessing operations described with respect to step 204 of process 200 for the corresponding GT segmentation masks. In this regard, the preprocessing preformed at 404 can vary depending on the type of the auto-segmentation masks (e.g., modality, 3D or 2D image data, anatomical region scanned, acquisition parameters used, etc.), as described with reference to process 200.

At 406, the model execution component 120 applies the trained version of the (multi-channel) reconstruction model 118 to the (preprocessed) auto-segmentation masks to generate reconstructed versions of the auto-segmentation masks. In this regard, the model execution component 120 can stack the respective auto-segmentation masks channel wise such that the respective auto-segmentation masks corresponding to the different anatomical structures are input to the designated channels for the corresponding structures. The output of step 406 includes reconstructed segmentation masks for each of the auto-segmentation masks.

Figure 5:
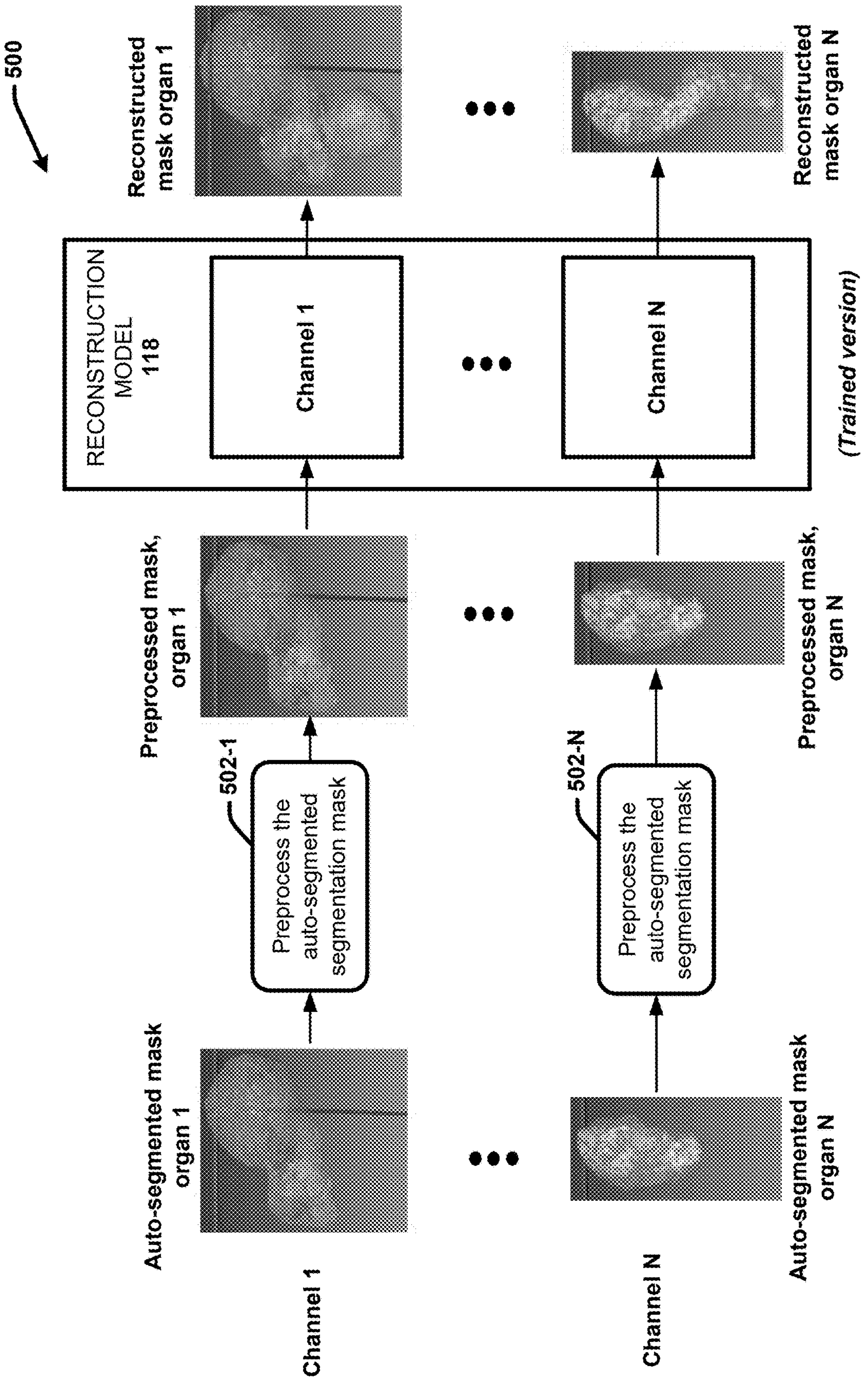
FIG. 5 illustrates an example implementation of the process presented in FIG. 4, in accordance with one or more embodiments of the disclosed subject matter.

For example, FIG. 5 illustrates an example implementation process 500 of steps 404 and 406 of process 400 as applied to the 3D MR segmentation mask implementation illustrated in FIG. 3. In accordance with process 500, the target segmentation model corresponds to the same target segmentation model associated with process 300, that is a multi-organ segmentation model configured to segment a defined set of organs from 3D MR images of the pelvic region. To this end, the reconstruction model 118 illustrated in FIG. 5 corresponds to the trained version of the reconstruction model 118 as trained in accordance with process 300. In accordance with process 500, the model execution component 120 can stack the auto-segmentation masks for each organ channel-wise such that each organ segmentation mask is processed in parallel via their corresponding, designated channel of the (multi-channel) reconstruction model 118. At 502-1 through 502-N the respective auto-segmentation masks (e.g., auto-segmentation mask 1 through auto-segmentation mask k) are preprocessed by the preprocessing component 112 in accordance with the same manner in which the GT segmentation masks were preprocessed at 402-2 and 402-N in process 300. For example, as applied to 3D MR segmentation masks, this can include resampling the respective auto-segmentation mask to isotropic spacing (1.5×1.5×1.5 mm) and then padding them to a common spatial size (240×336×336 voxels). The model execution component 120 then inputs the respective preprocessed organ segmentation masks to their respective channels of the reconstruction model 118 and the reconstruction model generates the corresponding reconstructed masks.

With reference back to FIG. 4 in view of FIGS. 1-3 and 5, at 408, the quality assessment component 122 can assess the quality of the auto-segmentation masks, that is the auto-segmentation masks received at 402, based on a similarity comparison between the auto-segmentation masks and their corresponding reconstructed versions. In other embodiments, this similarity comparison can be between the preprocessed versions of the auto-segmentation masks and their corresponding reconstructed versions. In this regard, because the reconstruction model 118 was trained to transform noisy input segmentation masks into their corresponding GT versions (that were manually defined as the correct versions), the reconstructed segmentation masks generated by the trained version of the reconstruction model 118 from the auto-segmentation masks will also resemble presumed GT segmentation masks for the respective auto-segmentation masks. In other words, the reconstructed versions of the auto-segmentation masks correspond to optimal versions of the auto-segmentation masks respectively correctly defining the size and geometry of the respective anatomical structures depicted (e.g., without any physical or structural errors). Thus, if an auto-segmented mask is substantially similar to its reconstructed version generated by the reconstruction model 118, the quality assessment component 122 can consider the auto-segmented mask to be of sufficient accuracy and/or quality. On the other hand, if an auto-segmented mask is substantially dissimilar to its reconstructed version generated by the reconstruction model 118, the quality assessment component 122 can consider the auto-segmented mask to be of insufficient accuracy and/or quality, and thus an outlier or otherwise associated with an error.

In various embodiments, in association performing the quality assessment at 408, the quality assessment component 122 can determine, for each auto-segmentation mask included in the received set at 402, a measure of similarity between the auto-segmentation mask and its corresponding reconstructed version. To this end, the measure of similarity represents a measure of quality and/or accuracy of the auto-segmentation mask as generated via the target segmentation model. For example, the measure of similarity can correspond to a Dice score or a similar metric that represents the measure of similarity between the respective segmentation masks based on an amount of overlap between pixels or voxels included in the respective segmentation masks. The measure of similarity can also reflect differences in size and/or geometry between the respective segmentation masks. In some embodiments, the similarity comparison performed by the quality assessment component 122 can be the same or similar to the similarity comparison used during training to compute the loss between the respective input and target masks. Additionally, or alternatively, the similarity comparison can involve using one or more geometry based and/or sized based comparative functions to determine differences between the geometry and/or size of each auto-segmentation mask and its corresponding reconstructed version. In some embodiments, the one or more comparative functions can also generate visual mark-up data defining or indicating locations and/or regions of the auto-segmented mask associated with errors (e.g., missing regions, auxiliary regions, etc.) that can be applied to or overlaid onto the auto-segmentation mask in association with rendering the auto-segmentation mask, as described below. To this end, the similarity comparison does not involve assessing differences in pixel and/or voxel intensities. In some implementations, the similarity comparison functions of the quality assessment component 122 can be integrated within the reconstruction model (e.g., as a final processing module or layer of the reconstruction model 118 or the like).

In some embodiments, in association with assessing the quality of each individual auto-segmentation mask, the quality assessment component 122 can determine whether each individual auto-segmentation mask is of sufficient quality or not based on defined similarity criteria for the respective measures of similarity. For instance, in some implementations, the defined similarity criteria can include a defined, general threshold similarity measure (e.g., a threshold Dice score or the like) applicable to all of the individual auto-segmentation masks. With these implementations, the quality assessment component 122 can determine that a particular auto-segmentation mask for a particular anatomical structure is of sufficient quality or not based on whether its similarity measure falls above (and thus acceptable) or below (and thus not acceptable) the general threshold similarity measure.

In other implementations, the similarity criteria can define different threshold similarity measures tailored to the different anatomical structures. In other words, the threshold similarity measure can vary for the different anatomical structures. In this regard, the anatomical structure specific similarity measure threshold can depend on the ability of the reconstruction model 118 to accurately reconstruct the noise augmented input masks for the specific structure. For example, in some implementations, the training component 116 can determine the structure specific threshold for each anatomical structure by maximizing the F1 score of the outlier detection performance over different thresholds that binarize the outlier score using a validation dataset in association with the training process. With these implementations, the quality assessment component 122 can determine that a particular auto-segmentation mask for a particular anatomical structure is of sufficient quality or not based on whether its similarity measure falls above (and thus acceptable) or below (and thus not acceptable) a specific similarity measure threshold defined for that particular anatomical structure.

In some implementations, the quality assessment component 122 can classify any auto-segmentation mask that fails to satisfy the general similarity measure threshold or its' anatomy specific similarity measure threshold as an outlier or associated with an error. The quality assessment component 122 can also determine an overall quality measure for the set of auto-segmentation masks based on the collective measures of similarity determined for each of the individual segmentation masks relative to the general threshold or their anatomical structure specific thresholds (e.g., an average measure of similarity, an average Dice score, or another collective metric). In some embodiments, any information determined by the quality assessment component 122 can be included in quality assessment results data 138.

At 410, the quality assessment component 408 can further determine whether the quality of the auto-segmentation results is acceptable or not based on the individual measures of similarity determined for each of the different auto-segmentation mask and/or the overall quality measure and predefined acceptable criteria for the respective similarity measures and/or the overall quality measure. For example, in some embodiments, at 410, the quality assessment component 408 can be configured to simply determine whether the auto-segmentation results are acceptable or not based on whether the overall quality measure is above (and thus acceptable) or below (and thus not acceptable) a defined threshold overall quality measure. In another embodiment, the quality assessment component 408 can be configured to determine that the auto-segmentation results are unacceptable based any of the individual segmentation mask having a similarity measure that does not satisfy its particular anatomy specific similarity measure threshold.

In some embodiments, based on determination that the quality is acceptable, at 412, the quality assessment component 122 can report the auto-segmentation results as acceptable. Likewise, based on determination that the quality is not acceptable, at 414, the quality assessment component 122 can report the auto-segmentation results as unacceptable. For example, in some implementations, the quality assessment component 122 can generate quality assessment results data 138 comprising information (e.g., text data, image data, audible data, etc.) indicating the results are acceptable or not and the rendering component 124 can render the quality assessment results data 138 via a suitable electronic output device (e.g., a display, a speaker, etc.). The quality assessment results data 138 can also include information identifying the overall quality measure and the individual similarity measures determined for each different segmentation mask. The quality assessment results data 138 can also include warning data identifying any of the individual auto-segmentation masks that were found to be of insufficient quality and thus outliers (e.g., based on their similarity scores relative to their anatomy specific thresholds). In some implementations, the rendering component 124 can be configured to render warning data or a warning notification in response to a determination that an individual auto-segmentation mask was found to be of insufficient quality (e.g., based on its similarity measure being below its defined similarity threshold), the warning data can identify the particular auto-segmentation mask can include information regarding the basis for which it was deemed insufficient. In another example, the rendering component 124 can be configured to generate and render (via a suitable electronic output device) notification or warning data (e.g., to a suitable medical professional) in response to a determination that the auto-segmentation results are not acceptable.

In some embodiments, the rending component 124 can also render the segmentation masks and their reconstructed versions via a suitable graphical display to facilitate visualizing and reviewing (e.g., via a suitable medical professional) any detected errors between the respective segmentation masks. For example, the rendering component 124 can render an auto-segmentation mask determined to be of insufficient quality and thus an outlier and/or potentially associated with an error next to a visual rendering of its corresponding reconstructed version. In this manner, the rendering component 124 can provide visual information illustrating the physical (e.g., size and/or geometry based) differences between the respective masks and the region or regions associated with the auto-segmentation mask determined to be associated with an error, as illustrated in FIG. 6.

Figure 6:
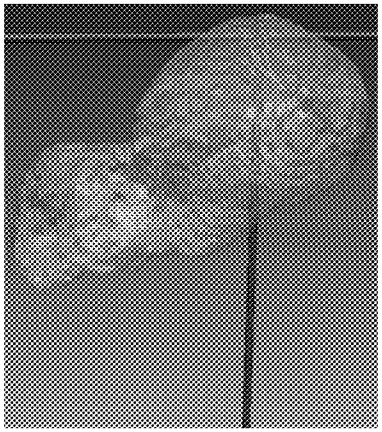
FIG. 6 illustrates an example graphical output data providing example quality assessment results in accordance with one or more embodiments of the disclosed subject matter.
Figure 6:
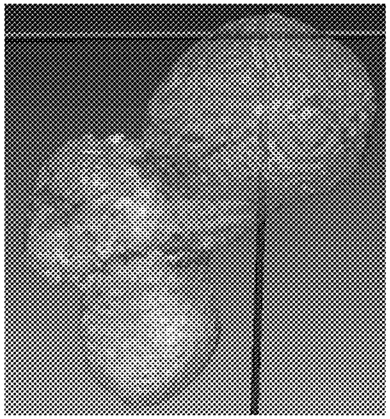
Figure 6:
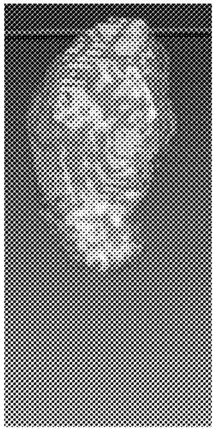
Figure 6:
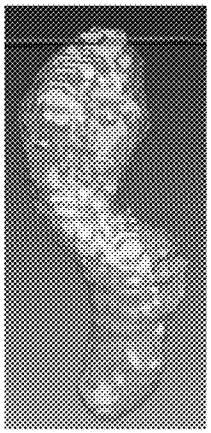

In this regard, FIG. 6 illustrates an example graphical output data 600 that can be included in the quality assessments result data 132 in accordance with one or more embodiments of the disclosed subject matter. In this example, the rendering component 124 has rendered the auto-segmentation masks and the reconstructed masks for two organs found to be outliers based on their respective Dice scores being below their respective organ specific threshold Dice scores. The graphical output data 600 also include text data describing the results of the quality assessment including information indicating their outlier classifications, their Dice scores, their organ specific threshold Dice scores and a basis rational describing the geometrical errors associated with the auto-segmentation masks.

In this regard, with refence to FIGS. 1-6, in some embodiments, in association with comparing an auto-segmentation mask to its reconstructed version, the quality assessment component 122 can also determine information defining any differences between the size and/or geometry of the respective masks (e.g., as determined using one or more geometry based and/or size-based image object comparative functions employed for the similarity assessment by the quality assessment component 122). For example, quality assessment component 122 can identify locations of errors, such as regions associated with the auto-segmentation mask that are missing (e.g., under segmented), regions corresponding to other anatomical structures aside from the target structure, regions associated with errors in curvature, geometry and/or size, and so on. The quality assessment component 122 can further include text and/or visual information regarding the physical differences determined between the respective segmentation masks (e.g., such as that shown in FIG. 6 and/or even more detailed/technical information). For example, in some embodiments, the one or more comparative functions can also generate visual mark-up data defining or indicating locations and/or regions of the auto-segmented mask associated with errors (e.g., missing regions, auxiliary regions, etc.) that can be applied to or overlaid onto the auto-segmentation mask in association with rendering the auto-segmentation mask. This manner, the quality assessment results data 138 and the error or outlier warnings are more explainable due to the ability to visualize the reconstructions and in association with text and/or visual information regarding the inaccurate regions and/or locations of auto-segmentation errors, leading to improved human-artificial intelligence interaction in the medical domain.

In some embodiments, the regulation component 126 can also regulate or control usage of the auto-segmentation results by one or more other applications 128 based on the quality assessment results. For example, in some implementations, the one or more other applications 128 can include a dosage calculation application that automatically calculates dosage amounts for IMRT based on the auto-segmentation masks. With these implementations, the regulation component 126 can be configured to direct the dosage calculation application to calculate the dosage amounts using the auto-segmentation masks based on a determination that their quality is acceptable, and prevent the dosage calculation application from using auto-segmentation results for the dosage calculation based on a determination that their quality is not acceptable.

Figure 7:
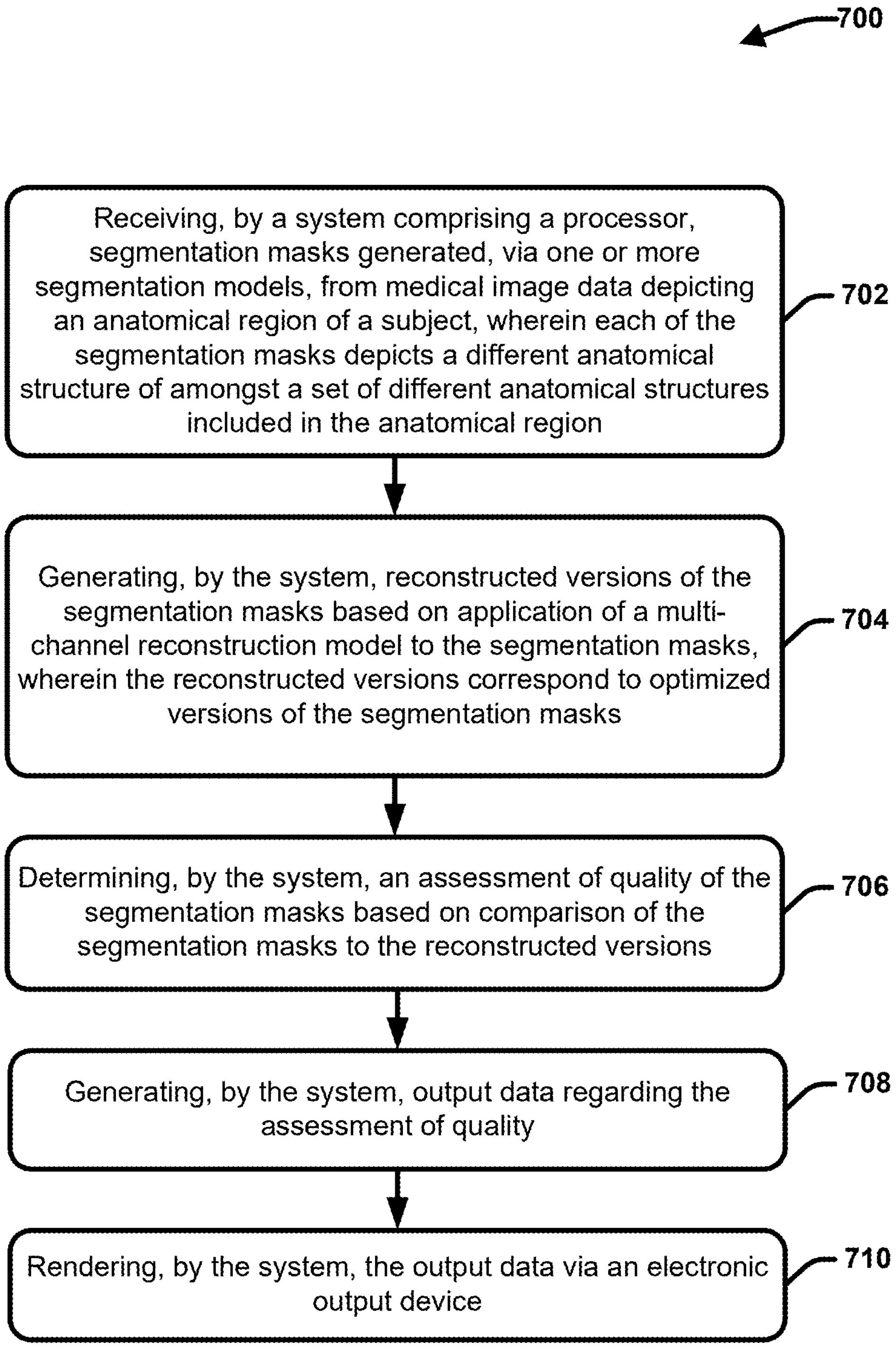
FIG. 7 presents a flow diagram of an example computer-implemented method for assessing the output quality of a multi-structure auto-segmentation model, in accordance with one or more embodiments of the disclosed subject matter.

FIG. 7 presents a flow diagram of an example computer-implemented method 700 for assessing the output quality of a multi-structure auto-segmentation model, in accordance with one or more embodiments of the disclosed subject matter. At 702, method 700 comprises receiving (e.g., via reception component 110), by a system comprising a processor (e.g., computing system 100), segmentation masks generated, via one or more segmentation models, from medical image data depicting an anatomical region of a subject, wherein each of the segmentation masks depicts a different anatomical structure of amongst a set of different anatomical structures included in the anatomical region. At 704, method 700 comprises generating, by the system (e.g., via model execution component 120 and reconstruction model 118), reconstructed versions of the segmentation masks based on application of a multi-channel reconstruction model (e.g., reconstruction model 118) to the segmentation masks, wherein the reconstructed versions correspond to optimized versions of the segmentation masks. At 706, method 700 comprises determining, by the system (e.g., via quality assessment component 122), an assessment of quality of the segmentation masks based on comparison of the segmentation masks to the reconstructed versions. At 708, method 700 comprises generating, by the system, output data regarding the assessment of quality (e.g., via quality assessment component 122). At 710, method 700 comprises rendering, by the system (e.g., via rendering component 124), the output data via an electronic output device (e.g., an electronic display, a speaker, etc.).

Figure 8:
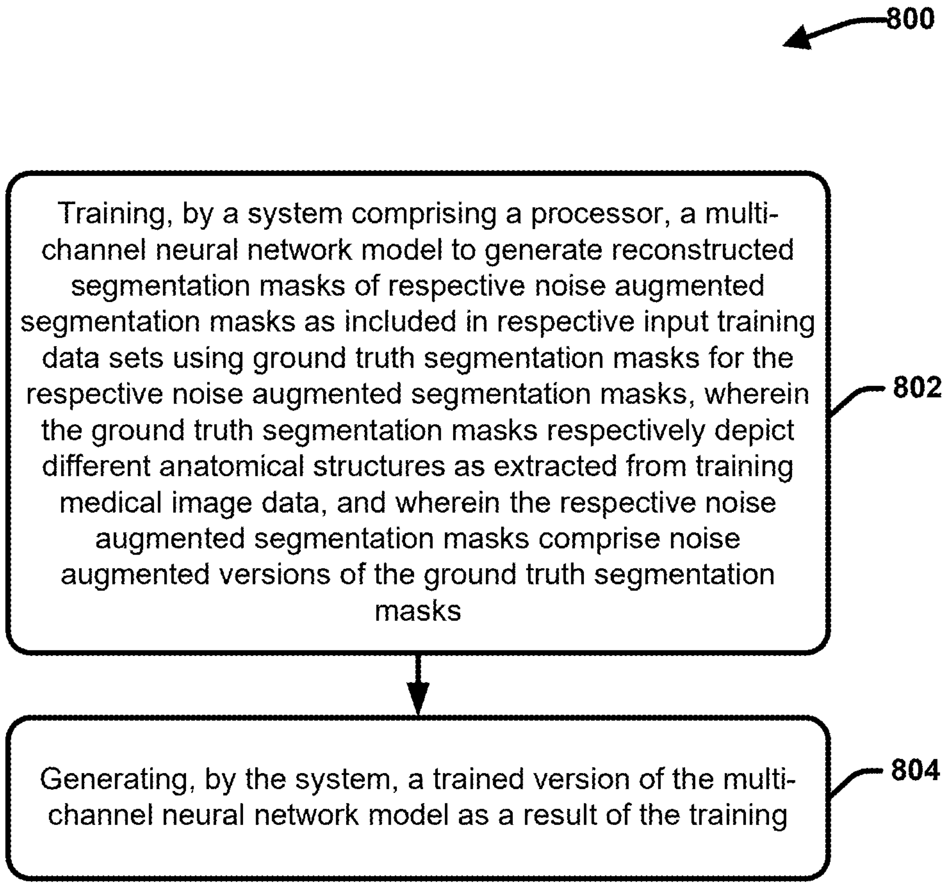
FIG. 8 presents a high-level flow diagram of an example computer-implemented method for generating a multi-channel segmentation mask reconstruction model, in accordance with one or more embodiments of the disclosed subject matter in accordance with one or more embodiments of the disclosed subject matter.

FIG. 8 presents a high-level flow diagram of an example computer-implemented method 800 for generating a multi-channel segmentation mask reconstruction model, in accordance with one or more embodiments of the disclosed subject matter in accordance with one or more embodiments of the disclosed subject matter. Method 800 comprises, at 802, training (e.g., via training component 116), by a system comprising a processor (e.g., computing system 100), a multi-channel neural network model (e.g., reconstruction model 118) to generate reconstructed segmentation masks of respective noise augmented segmentation masks as included in respective training data sets using ground truth segmentation masks for the respective noise augmented segmentation masks, wherein the ground truth segmentation masks respectively depict different anatomical structures (e.g., different types of anatomical structures, different organs, different ROIs, etc.) as extracted from training medical image data, and wherein the respective noise augmented segmentation masks comprise noise augmented versions of the ground truth segmentation masks. At 804, method 800 comprises generating, by the system (e.g., via training component 116), a trained version of the multi-channel neural network model as a result of the training.

Figure 9:
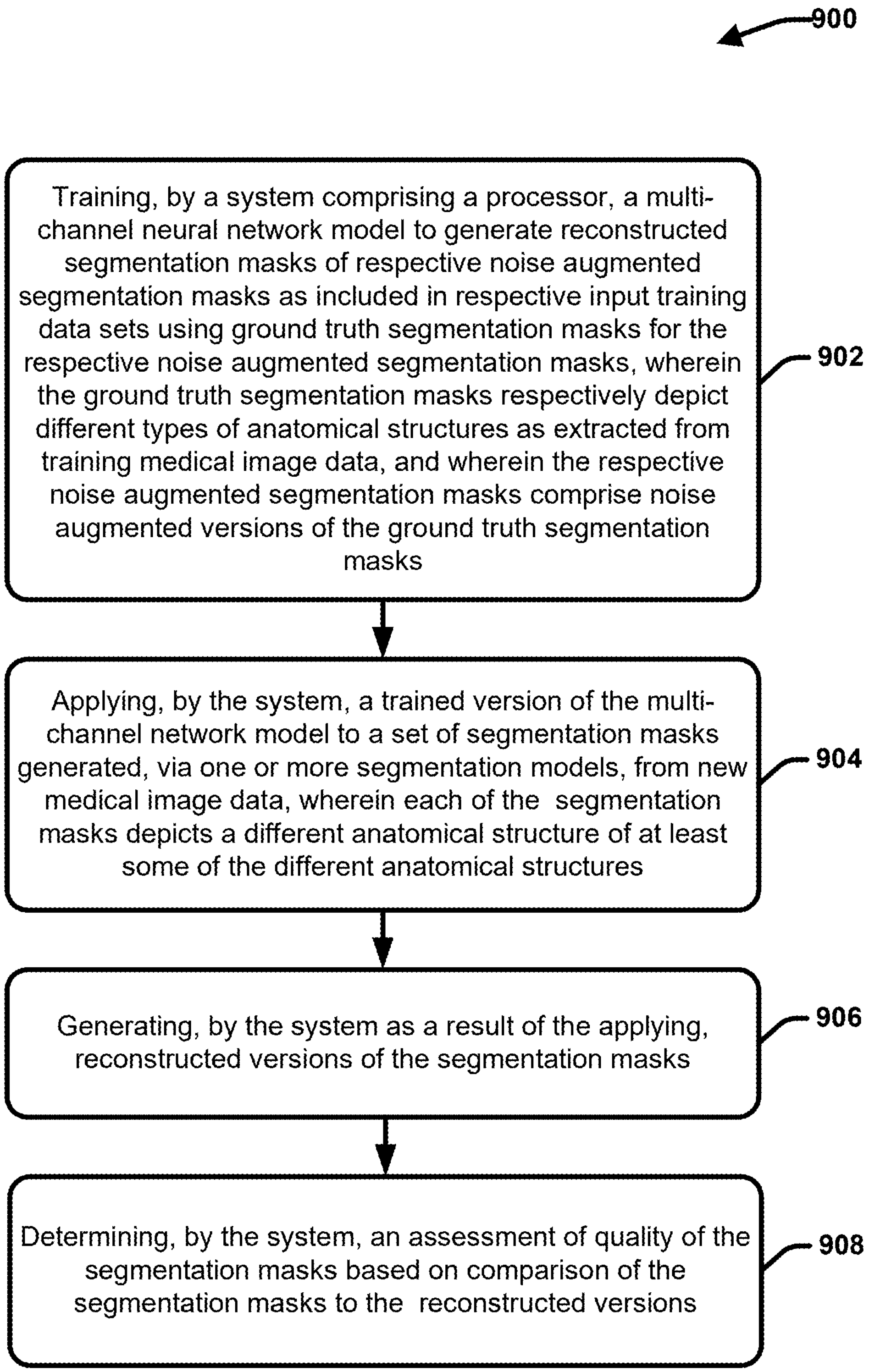
FIG. 9 presents a flow diagram of another example computer-implemented method for assessing the output quality of a multi-structure auto-segmentation model, in accordance with one or more embodiments of the disclosed subject matter.

FIG. 9 presents a flow diagram of an example computer-implemented method 900 for assessing the output quality of a multi-structure auto-segmentation model, in accordance with one or more embodiments of the disclosed subject matter. At 902, method 900 comprises training (e.g., via training component 116), by a system comprising a processor (e.g., computing system 100), a multi-channel neural network model (e.g., reconstruction model 118) to generate reconstructed segmentation masks of respective noise augmented segmentation masks as included in respective training data sets using ground truth segmentation masks for the respective noise augmented segmentation masks, wherein the ground truth segmentation masks respectively depict different anatomical structures (e.g., different types of anatomical structures, different organs, different ROIs, etc.) as extracted from medical image data, and wherein the respective noise augmented segmentation masks comprise noise augmented versions of the ground truth segmentation masks. At 904, method 900 comprises applying, by the system (e.g., via model execution component 120), a trained version of the multi-channel network model to a set of segmentation masks generated, via one or more segmentation models, from new medical image data, wherein each of the segmentation masks depicts a different anatomical structure of at least some of the different anatomical structures. At 906, method 900 comprises generating, by the system as a result of the applying, reconstructed versions of the segmentation masks. At 908, method 900 comprises determining, by the system (e.g., via quality assessment 122), an assessment of quality of the segmentation masks based on comparison of the segmentation masks to the reconstructed versions.

Figure 10:
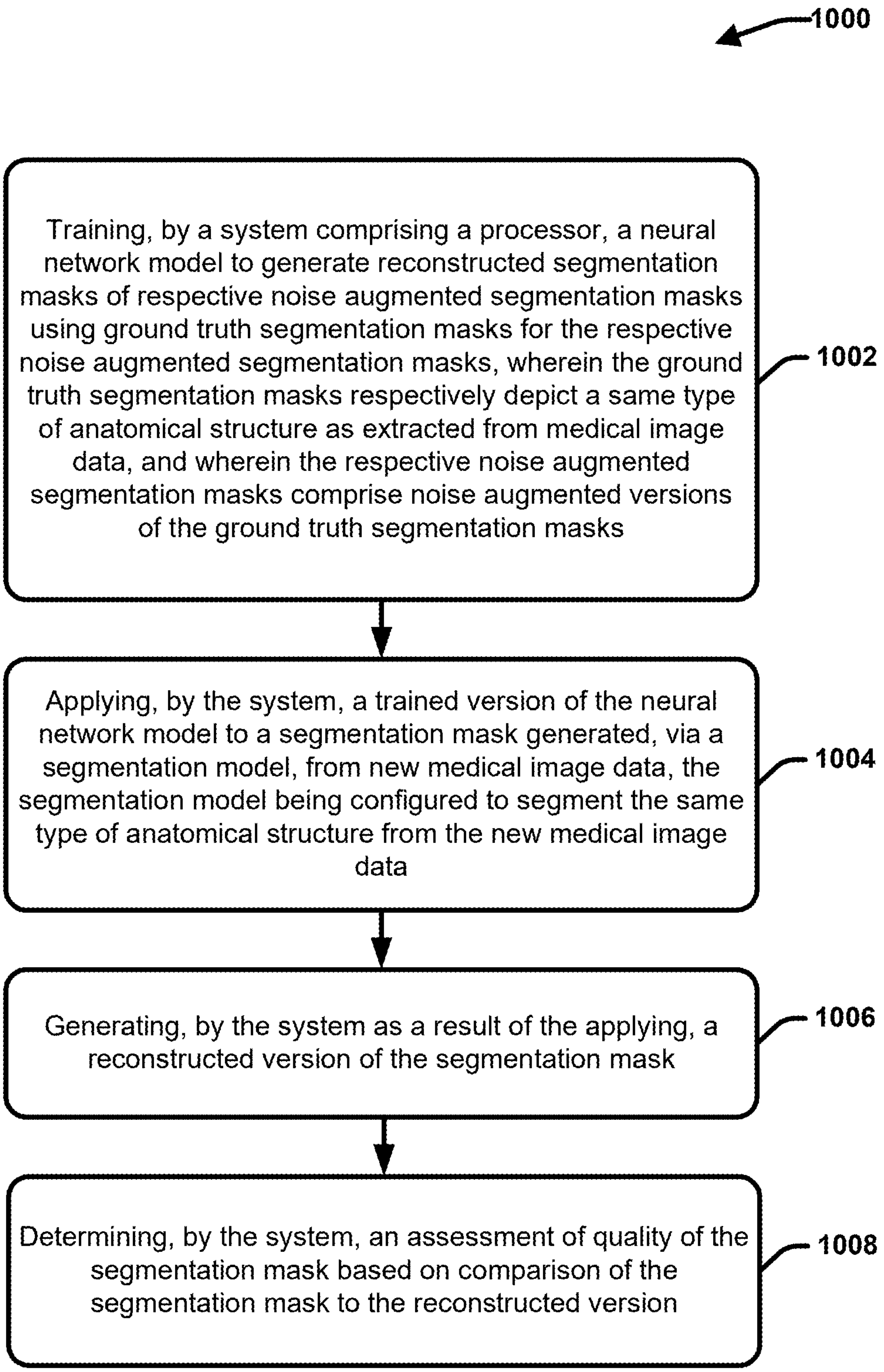
FIG. 10 presents a flow diagram of an example method for assessing the output quality of a single structure auto-segmentation model, in accordance with one or more embodiments of the disclosed subject matter.

FIG. 10 presents a flow diagram of an example method 1000 for assessing the output quality of a single structure auto-segmentation model, in accordance with one or more embodiments of the disclosed subject matter. To this end, method 1000 corresponds to method 900 with the exception that the target segmentation model corresponds to a segmentation model configured to automatically segment a single anatomical structure and with respect to the reconstruction model 118 being a single-channel model for the single anatomical structure as opposed to the multi-channel model version.

At 1002, method 1000 comprises training (e.g., via training component 116), by a system comprising a processor (e.g., computing system 100), a single-channel neural network model (e.g., reconstruction model 118) to generate reconstructed segmentation masks of respective noise augmented segmentation masks using ground truth segmentation masks for the respective noise augmented segmentation masks, wherein the ground truth segmentation masks respectively depict a same type of anatomical structure as extracted from medical image data, and wherein the respective noise augmented segmentation masks comprise noise augmented versions of the ground truth segmentation masks. At 1004, method 1000 comprises applying, by the system (e.g., via model execution component 120), a trained version of the neural network model to a segmentation mask generated, via a segmentation model, from new medical image data, the segmentation model being configured to segment the same type of anatomical structure from the new medical image data. At 1006, method 1000 comprises generating, by the system as a result of the applying, a reconstructed version of the segmentation mask. At 1008, method 1000 comprises determining, by the system (e.g., via quality assessment 122), an assessment of quality of the segmentation mask based on comparison of the segmentation mask to the reconstructed version.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and machine-learning programming languages such as like CUDA, Python, Tensorflow, PyTorch, and the like. The computer readable program instructions can execute entirely on the user's computer, partly on the user's computer, as a stand-alone software package, partly on the user's computer and partly on a remote computer or entirely on the remote computer or server using suitable processing hardware. In the latter scenario, the remote computer can be connected to the user's computer through any type of network, including a local area network (LAN) or a wide area network (WAN), or the connection can be made to an external computer (for example, through the Internet using an Internet Service Provider). In various embodiments involving machine-learning programming instructions, the processing hardware can include one or more graphics processing units (GPUs), central processing units (CPUs), and the like. For example, one or more of the disclosed deep-learning models (e.g., the segmentation models, the reconstruction model 118, and/or combinations thereof) may be written in a suitable machine-learning programming language and executed via one or more GPUs, CPUs or combinations thereof. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 11, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 11:
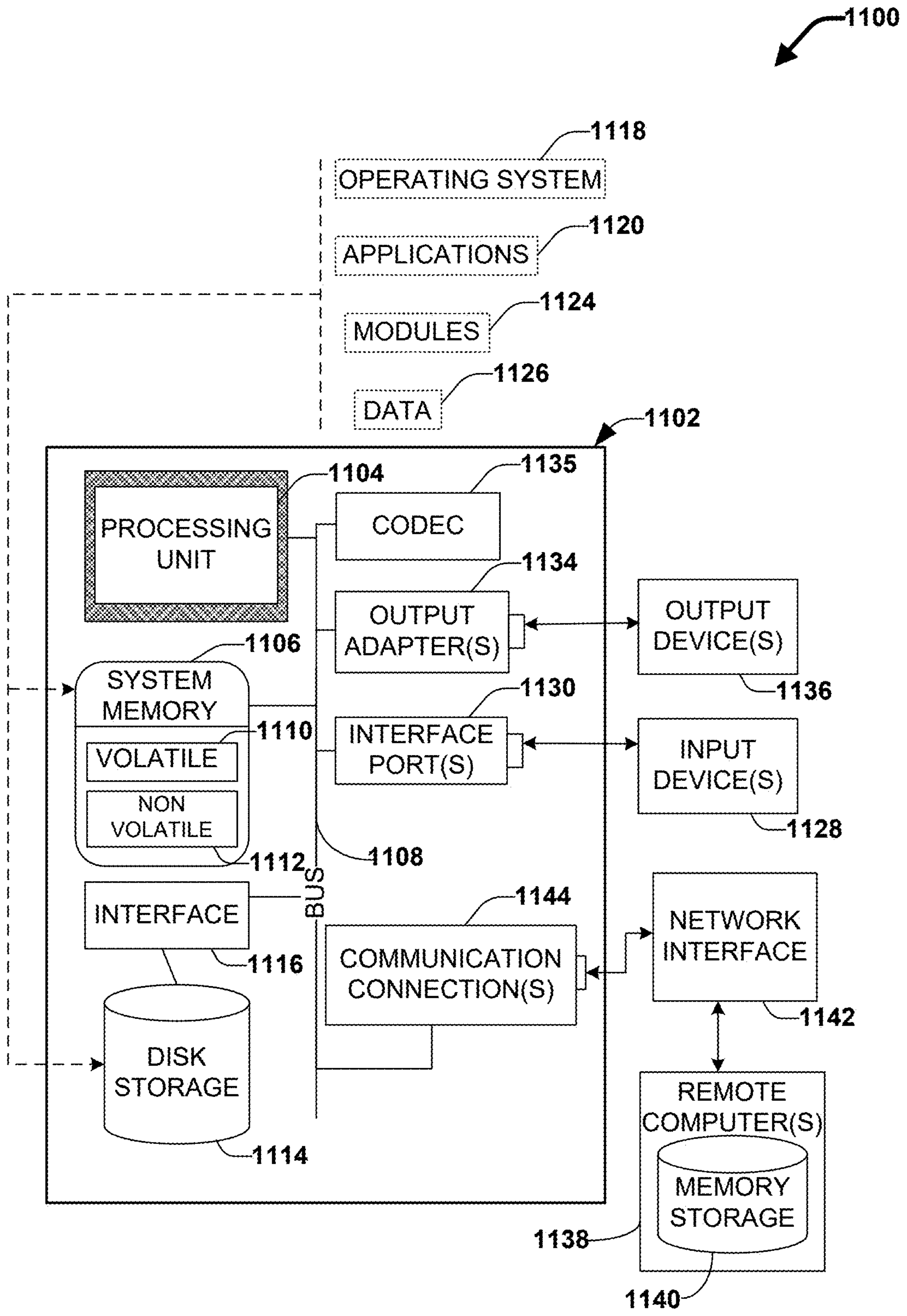
FIG. 11 illustrates a block diagram of an example, non-limiting operating environment in which one or more embodiments described herein can be facilitated.

With reference to FIG. 11, an example environment 1100 for implementing various aspects of the claimed subject matter includes a computer 1102. The computer 1102 includes a processing unit 1104, a system memory 1106, a codec 1135, and a system bus 1108. The system bus 1108 couples system components including, but not limited to, the system memory 1106 to the processing unit 1104. The processing unit 1104 can be any of various available processors. Dual microprocessors, one or more GPUs, CPUs, and other multiprocessor architectures also can be employed as the processing unit 1104.

The system bus 1108 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

The system memory 1106 includes volatile memory 1110 and non-volatile memory 1112, which can employ one or more of the disclosed memory architectures, in various embodiments. The basic input/output system (BIOS), containing the basic routines to transfer information between elements within the computer 1102, such as during start-up, is stored in non-volatile memory 1112. In addition, according to present innovations, codec 1135 can include at least one of an encoder or decoder, wherein the at least one of an encoder or decoder can consist of hardware, software, or a combination of hardware and software. Although, codec 1135 is depicted as a separate component, codec 1135 can be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1112 can employ one or more of the disclosed memory devices, in at least some embodiments. Moreover, non-volatile memory 1112 can be computer memory (e.g., physically integrated with computer 1102 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1110 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1102 can also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD), flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD- ROM). To facilitate connection of the disk storage 1114 to the system bus 1108, a removable or non-removable interface is typically used, such as interface 1116. It is appreciated that disk storage 1114 can store information related to a user. Such information might be stored at or provided to a server or to an application running on a user device. In one embodiment, the user can be notified (e.g., by way of output device(s) 1136) of the types of information that are stored to disk storage 1114 or transmitted to the server or application. The user can be provided the opportunity to opt-in or opt-out of having such information collected or shared with the server or application (e.g., by way of input from input device(s) 1128).

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port can be used to provide input to computer 1102 and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a system comprising a processor, segmentation masks generated, via one or more segmentation models, from medical image data depicting an anatomical region of a subject, wherein each of the segmentation masks depicts a different anatomical structure of a set of different anatomical structures included in the anatomical region;

generating, by the system, reconstructed versions of the segmentation masks based on application of a multi-channel reconstruction model to the segmentation masks, wherein the reconstructed versions correspond to optimized versions of the segmentation masks, wherein the multi-channel reconstruction model is trained using ground truth segmentation masks that respectively depict the different anatomical structures and corresponding noise augmented versions of the ground truth segmentation masks, and wherein the noise augmented versions comprise structure specific noise generated independently for each of the different anatomical structures;

determining, by the system, an assessment of quality of the segmentation masks based on a structure specific comparison of the segmentation masks to the reconstructed versions generated for the same anatomical structure;

generating, by the system, output data regarding the assessment of quality; and rendering, by the system, the output data via an electronic output device.

2. The method of claim 1, wherein determining the assessment comprises, for each segmentation mask:

determining, by the system, a measure of similarity between the segmentation mask and a reconstructed version of the segmentation mask, wherein the measure of similarity represents a measure of quality of the segmentation mask as generated via the one or more segmentation models; and determining, by the system, whether the segmentation mask is associated with an error based on whether the measure of similarity satisfies a threshold measure of similarity.

3. The method of claim 2, wherein the threshold measure of similarity varies for the different anatomical structures.

4. The method of claim 2, wherein determining the assessment further comprises:

determining, by the system, whether the segmentation masks collectively satisfy an acceptable quality criterion based on collective measures of similarity determined for the segmentation masks, and wherein the output data indicates whether the segmentation masks collectively satisfy the acceptable quality criterion.

5. The method of claim 4, further comprising:

regulating, by the system, usage of the segmentation masks by a clinical application based on whether the segmentation masks collectively satisfy the acceptable quality criterion.

6. The method of claim 2, further comprising, for each segmentation mask, based on a determination that the segmentation mask is associated with the error:

generating, by the system, warning data indicating the segmentation mask is associated with the error, wherein the output data comprises the warning data, wherein the electronic output device comprises a display, and wherein the rendering comprises rendering the warning data via the display in association with rendering the segmentation mask and optionally rendering the reconstructed version of the segmentation mask.

7. The method of claim 2, wherein the determining the assessment further comprises, based on the determination that the segmentation mask is associated with the error:

determining, by the system, based on comparison of the segmentation mask to the reconstructed version, error information regarding a difference between a size and/or a geometry of the segmentation mask and the reconstructed version, and wherein the output data comprises the error information.

8. The method of claim 1, wherein the multi-channel reconstruction model comprises a neural network model, and wherein the method further comprises:

training, by the system, the multi-channel reconstruction model, wherein the training comprises training the multi-channel reconstruction model to generate reconstructed masks of respective noise augmented segmentation masks as included in respective training data sets using ground truth segmentation masks for the respective noise augmented segmentation masks, wherein the ground truth segmentation masks respectively depict the different anatomical structures as extracted from training medical image data, and wherein the respective noise augmented segmentation masks comprise noise augmented versions of the ground truth segmentation masks.

9. The method of claim 8, further comprising:

generating, by the system, the noise augmented segmentation masks from the ground truth segmentation masks.

10. The method of claim 9, wherein generating the noise augmented segmentation masks comprises, for each ground truth segmentation mask:

integrating, by the system, an amount of noise data into the ground truth segmentation mask tailored based on a size and a geometry of an anatomical structure depicted in the ground truth segmentation mask.

11. The method of claim 10, wherein the integrating comprises adding the amount of noise data to the ground truth segmentation mask or removing the amount of the noise data from the ground truth segmentation mask.

12. A system, comprising:

a memory that stores computer-executable components; and a processor that executes the computer-executable components stored in the memory, wherein the computer-executable components comprise:

a reception component that receives segmentation masks generated, via one or more segmentation models, from medical image data depicting an anatomical region of a subject, wherein each of the segmentation masks depicts a different anatomical structure of a set of different anatomical structures included in the anatomical region;

a model execution component that generates reconstructed versions of the segmentation masks based on application of a multi-channel reconstruction model to the segmentation masks, wherein the reconstructed versions correspond to optimized versions of the segmentation masks;

a quality assessment component that determines an assessment of quality of the segmentation masks based on comparison of the segmentation masks to the reconstructed versions and generates output data regarding the assessment of quality;

a noise augmentation component that generates the noise augmented segmentation masks from the ground truth segmentation masks, wherein for each ground truth segmentation mask, the noise augmentation component integrates an amount of noise data into the ground truth segmentation mask tailored based on a size, a geometry, or a combination thereof for an anatomical structure depicted in the ground truth segmentation mask; and a rendering component that renders the output data via an electronic output device.

13. The system of claim 12, wherein for each segmentation mask, the quality assessment component:

determines a measure of similarity between the segmentation mask and a reconstructed version of the segmentation mask, wherein the measure of similarity represents a measure of quality of the segmentation mask as generated via the one or more segmentation models, determines whether the segmentation mask is associated with an error based on whether the measure of similarity satisfies a threshold measure of similarity, and generates warning data indicating the segmentation mask is associated with the error based on a determination that the segmentation mask is associated with the error, wherein the output data comprises the warning data.

14. The system of claim 13, wherein the threshold measure of similarity varies for the different anatomical structures.

15. The system of claim 13, wherein the quality assessment component determines whether the segmentation masks collectively satisfy an acceptable quality criterion based on collective measures of similarity determined for the segmentation masks, and wherein the output data indicates whether the segmentation masks collectively satisfy the acceptable quality criterion.

16. The system of claim 15, wherein the computer-executable components further comprise:

a regulation component that regulates usage of the segmentation masks by a clinical application based on whether the segmentation masks collectively satisfy the acceptable quality criterion.

17. The system of claim 13, wherein based on a determination that the segmentation mask is associated with the error, the quality assessment component determines, based on comparison of the segmentation mask to the reconstructed version, error information regarding a difference between a size and/or a geometry of the segmentation mask and the reconstructed version, and wherein the rendering component renders the warning data and the error information via an electronic display in association with rendering the segmentation mask and the reconstructed version of the segmentation mask.

18. The system of claim 12, wherein the multi-channel reconstruction model comprises a neural network model, and wherein the computer-executable components further comprise:

a training component that trains the multi-channel reconstruction model using an unsupervised machine learning process, wherein the unsupervised machine learning process comprises training the multi-channel reconstruction model to generate reconstructed masks of respective noise augmented segmentation masks as included in respective training data sets using ground truth segmentation masks for the respective noise augmented segmentation masks, wherein the ground truth segmentation masks respectively depict the different anatomical structures as extracted from training medical image data, and wherein the respective noise augmented segmentation masks comprise noise augmented versions of the ground truth segmentation masks.

19. A non-transitory machine-readable storage medium, comprising executable instructions that, when executed by a processor, facilitate performance of operations, comprising:

receiving segmentation masks generated, via one or more segmentation models, from medical image data depicting an anatomical region of a subject, wherein each of the segmentation masks depicts a different anatomical structure of a set of different anatomical structures included in the anatomical region;

generating reconstructed versions of the segmentation masks based on application of a multi-channel reconstruction model to the segmentation masks, wherein the reconstructed versions correspond to optimized versions of the segmentation masks, wherein the multi-channel reconstruction model is trained using ground truth segmentation masks that respectively depict the different anatomical structures and corresponding noise augmented versions of the ground truth segmentation masks, and wherein the noise augmented versions comprise structure specific noise generated independently for each of the different anatomical structures;

determining an assessment of quality of the segmentation masks based on a structure specific comparison of the segmentation masks to the reconstructed versions generated for the same anatomical structure;

generating output data regarding the assessment of quality; and rendering the output data via an electronic output device.

* * * * *